US012182471B2

United States Patent
Jang et al.

(10) Patent No.: US 12,182,471 B2
(45) Date of Patent: Dec. 31, 2024

(54) ELECTRONIC DEVICE USING COMMUNICATION CHANNEL GENERATED BY ELECTRICAL CONNECTION BETWEEN ELECTRONIC DEVICE AND EXTERNAL ELECTRONIC DEVICE, AND METHOD FOR OPERATING ELECTRONIC DEVICE

(71) Applicant: Samsung Electronics Co., Ltd., Gyeonggi-do (KR)

(72) Inventors: Kyungik Jang, Gyeonggi-do (KR); Hyeonggeun Kim, Gyeonggi-do (KR); Jungsoo Kim, Gyeonggi-do (KR); Hasik Moon, Gyeonggi-do (KR); Doosuk Kang, Gyeonggi-do (KR); Byoungchul Lee, Gyeonggi-do (KR); Jungho Cho, Gyeonggi-do (KR); Bokun Choi, Gyeonggi-do (KR); Donghoon Hyun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 17/844,891

(22) Filed: Jun. 21, 2022

(65) Prior Publication Data
US 2022/0322470 A1 Oct. 6, 2022

Related U.S. Application Data

(63) Continuation of application No. PCT/KR2020/010070, filed on Jul. 30, 2020.

(30) Foreign Application Priority Data

Feb. 10, 2020 (KR) .................. 10-2020-0015956

(51) Int. Cl.
*G06F 3/16* (2006.01)
*G10L 19/00* (2013.01)
(Continued)

(52) U.S. Cl.
CPC .............. *G06F 3/162* (2013.01); *G10L 19/00* (2013.01); *H04B 3/54* (2013.01); *H04R 1/08* (2013.01);
(Continued)

(58) Field of Classification Search
CPC ......... G06F 3/162; G06F 3/165; G10L 19/00; G10L 19/0017; H04B 3/54; H04R 1/08;
(Continued)

(56) References Cited

U.S. PATENT DOCUMENTS 9,013,145 B2  4/2015  Castillo et al.
10,212,506 B2 *  2/2019  Panecki .................. H02J 50/10
(Continued)

FOREIGN PATENT DOCUMENTS

KR    20-2008-0000553 U    4/2008
KR    10-1830397 B1    2/2018
(Continued)

OTHER PUBLICATIONS

Korean Office Action dated Jun. 11, 2024.

*Primary Examiner* — Eugene Yun
(74) *Attorney, Agent, or Firm* — Cha & Reiter, LLC

(57) ABSTRACT

An electronic device and method are disclosed. The electronic device includes: a communication circuit for transceiving data, a charging circuit for receiving power via an electrical connection, and controlling a communication channel operative through the electrical connection, a memory, and a processor. The processor implements the method, including: receiving, via the charging circuit, and through the electrical connection, connection information of a first external electronic device for communicatively connecting to the first external electronic device, from a second external electronic device into which the electronic device is inserted and receiving power via the charging circuit, trans-
(Continued)

mitting, via the charging circuit, and through the electrical connection, connection information of the electronic device for communicatively connecting to the first external electronic device, to the second external electronic device, and storing the connection information of the first external electronic device in the memory.

16 Claims, 12 Drawing Sheets

(51) Int. Cl.
*H04B 3/54* (2006.01)
*H04R 1/08* (2006.01)
*H04R 1/10* (2006.01)
*H04W 4/80* (2018.01)
*H04W 76/14* (2018.01)

(52) U.S. Cl.
CPC ......... *H04R 1/1016* (2013.01); *H04R 1/1025* (2013.01); *H04R 1/1041* (2013.01); *H04W 4/80* (2018.02); *H04W 76/14* (2018.02); *H04R 2420/07* (2013.01)

(58) Field of Classification Search
CPC .. H04R 1/1016; H04R 1/1025; H04R 1/1041; H04R 2420/07; H04W 4/80; H04W 76/14; H04N 21/41407; H04N 21/43076; H04N 21/43637; H04N 21/4392; H04N 21/8113
USPC ...................................................... 455/41.2
See application file for complete search history.

(56) References Cited

U.S. PATENT DOCUMENTS

| 10,743,359 B2 | 8/2020 | Bae et al. |
| 10,958,094 B2 | 3/2021 | Choi et al. |
| 11,601,791 B2 | 3/2023 | Lim et al. |
| 2018/0341448 A1 | 11/2018 | Behzadi et al. |
| 2018/0376233 A1 | 12/2018 | Watson et al. |
| 2019/0020375 A1 | 1/2019 | Oiwa et al. |
| 2021/0160697 A1* | 5/2021 | Zheng ................... H04W 76/38 |

FOREIGN PATENT DOCUMENTS

| KR | 10-1875217 B1 | 7/2018 |
| KR | 10-2019-0095784 A | 8/2019 |
| KR | 10-2019-0122392 A | 10/2019 |
| KR | 10-2020-0005053 A | 1/2020 |
| KR | 10-2020-0012534 A | 2/2020 |

* cited by examiner

ELECTRONIC DEVICE USING COMMUNICATION CHANNEL GENERATED BY ELECTRICAL CONNECTION BETWEEN ELECTRONIC DEVICE AND EXTERNAL ELECTRONIC DEVICE, AND METHOD FOR OPERATING ELECTRONIC DEVICE

CROSS-REFERENCE TO RELATED APPLICATION(S)

This application is a continuation of and based on and claims priority under 35 U.S.C. § 120 to PCT International Application No. PCT/KR2020/010070, which was filed on Jul. 30, 2020, and claims priority to Korean Patent Application No. 10-2020-0015956, filed on Feb. 10, 2020, in the Korean Intellectual Property Office, the disclosures of which are incorporated by reference herein their entirety.

BACKGROUND

Technical Field

The disclosure relates to pairable electronic devices, and more particularly, to using an external electronic device to exchange and update address information for pairing two pairable electronic devices.

Description of Related Art

Various electronic devices such as smartphones, tablet Personal Computers (PCs), Portable Multimedia Players (PMPs), Personal Digital Assistants (PDAs), laptop PCs, and wearable devices have become widespread in usage.

An electronic device may output audio using a wireless earphone device. The wireless earphone device may receive sound data for the audio from the electronic device. In some cases, two wireless earphones may be provided (e.g., one for each ear), (such as, for example and the wireless earphones may further be removably housed in a cradle for charging.

The two wireless earphones may be connected to one another via wireless communication, and may exchange data for synchronizing the output of sound. Each of the two wireless earphones may store address information of the other earphone for facilitating a wireless communication connection.

The address information for each opposing earphone may be pre-stored in the respective earphone during manufacturing or the earphone. As a result, it may be difficult to change the stored address information for the opposing earphone. This may create artificial barriers to pairing new wireless earphones to each other, that were not produced as a set, as the new earphone will have a different address that must be registered to the opposing earphone. This creates user inconvenience. For example, if a user loses an earphone and finds a replacement, they may be unable to pair the new earphone with their surviving earphone, due to the difficult of storing the address information of the new earphone on the surviving earphone.

SUMMARY

According to certain embodiments of the disclosure, the present disclosure includes an electronic device and method in which it is possible to exchange address information of an electronic device to be newly paired, using a cradle into which wireless earphones are insertable.

An electronic device, according to certain embodiments of the disclosure, includes a communication circuit for transceiving data; a charging circuit for receiving power via an electrical connection, and controlling a communication channel operative through the electrical connection; a memory; and a processor operatively coupled to the communication circuit, the charging circuit, and the memory, wherein the processor is configured to: receive, via the charging circuit, and through the electrical connection, connection information of a first external electronic device for communicatively connecting to the first external electronic device, from a second external electronic device into which the electronic device is inserted and receiving power via the charging circuit, transmit, via the charging circuit, and through the electrical connection, connection information of the electronic device for communicatively connecting to the first external electronic device, to the second external electronic device, and store the connection information of the first external electronic device in the memory.

An electronic device according to certain embodiments of the disclosure includes a charging circuit configured to transmit power to a first external electronic device and/or a second external electronic device, including a first terminal and second terminal; a memory; and a processor, wherein the processor is configured to: establish a first communication channel with the first external electronic device, through an electrical connection formed between the first terminal and the first external electronic device, receive, via charging circuit and through the first communication channel, connection information on the first external electronic device from the first external electronic device, establish a second communication channel with the second external electronic device, through an electrical connection formed between the second terminal and the second external electronic device, and transmit, via the charging circuit and through the second communication channel, the received connection information on the first external electronic device to the second external electronic device.

A method of operating an electronic device for pairing to a first external electronic device according to certain embodiments of the disclosure includes: establishing, via at least one processor, a communication channel with a second external electronic device, through an electrical connection formed with the second external electronic device via a charging circuit, when the electronic device is inserted into the second external electronic device; transmitting, via the established communication channel, connection information on the electronic device to the second external electronic device; receiving, via the established communication channel, connection information on the first external electronic device; and storing the received connection information on the first external electronic device in a memory.

In an electronic device and a method of operating an electronic device according to certain embodiments of the disclosure, it is possible to receive information on a second external electronic device utilized for making a communication connection between the electronic device and the second external electronic device, through a an electrical connection formed between the electronic device and a first external electronic device such as, for example, an earphone cradle.

According to certain embodiments of the disclosure, even when a communication connection between the electronic device and the external electronic device is not established, the electronic device may receive information on the external electronic device utilized for establishing the communication connection between the electronic device and the external electronic device.

In an electronic device and a method of operating an electronic device according to certain embodiments of the disclosure, it is possible to establish a connection between a new external electronic device and the electronic device, by updating information on the external electronic device for pairing, based on the received information on the external electronic device.

DETAILED DESCRIPTION

Figure 1:
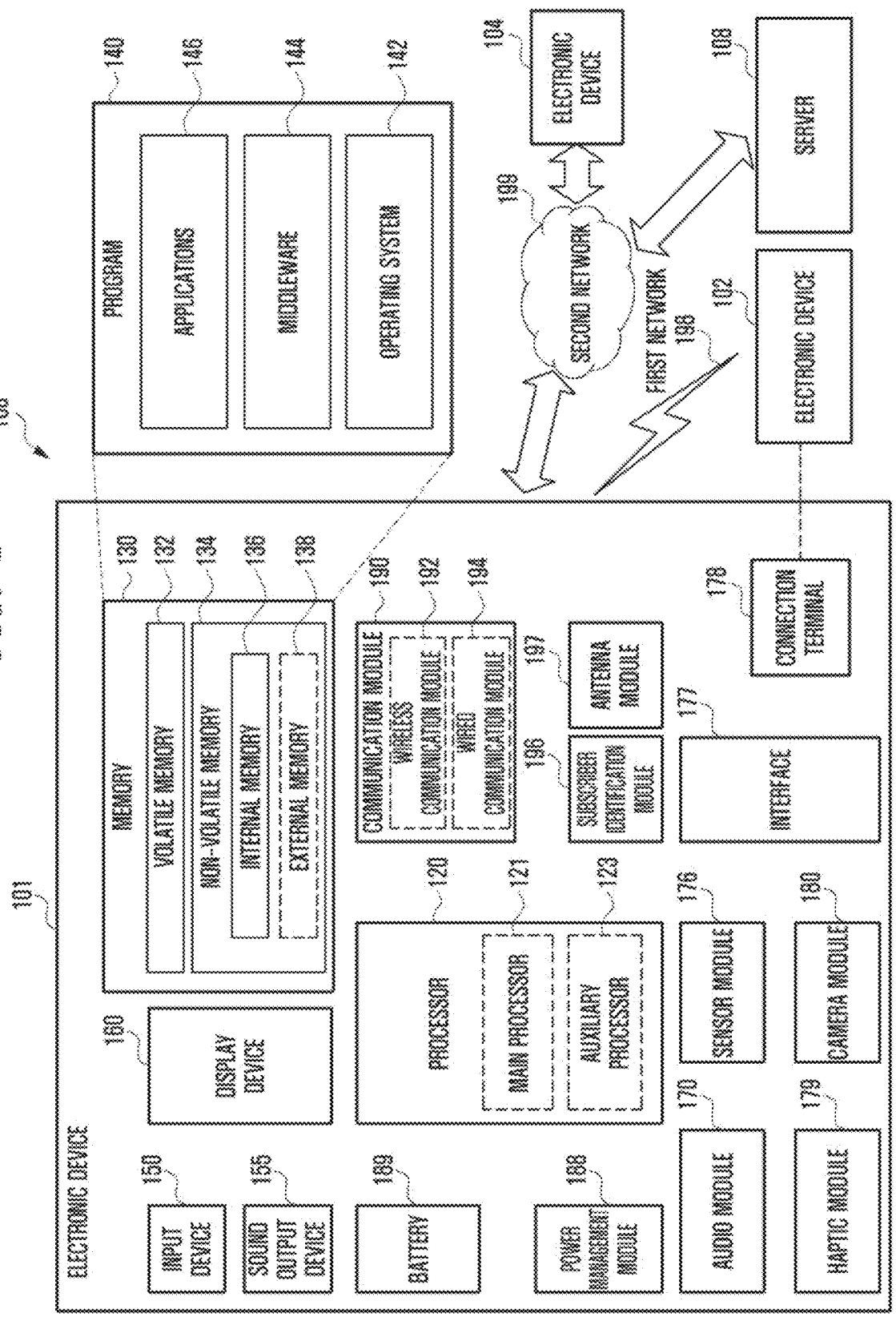
FIG. 1 is a block diagram of an electronic device according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
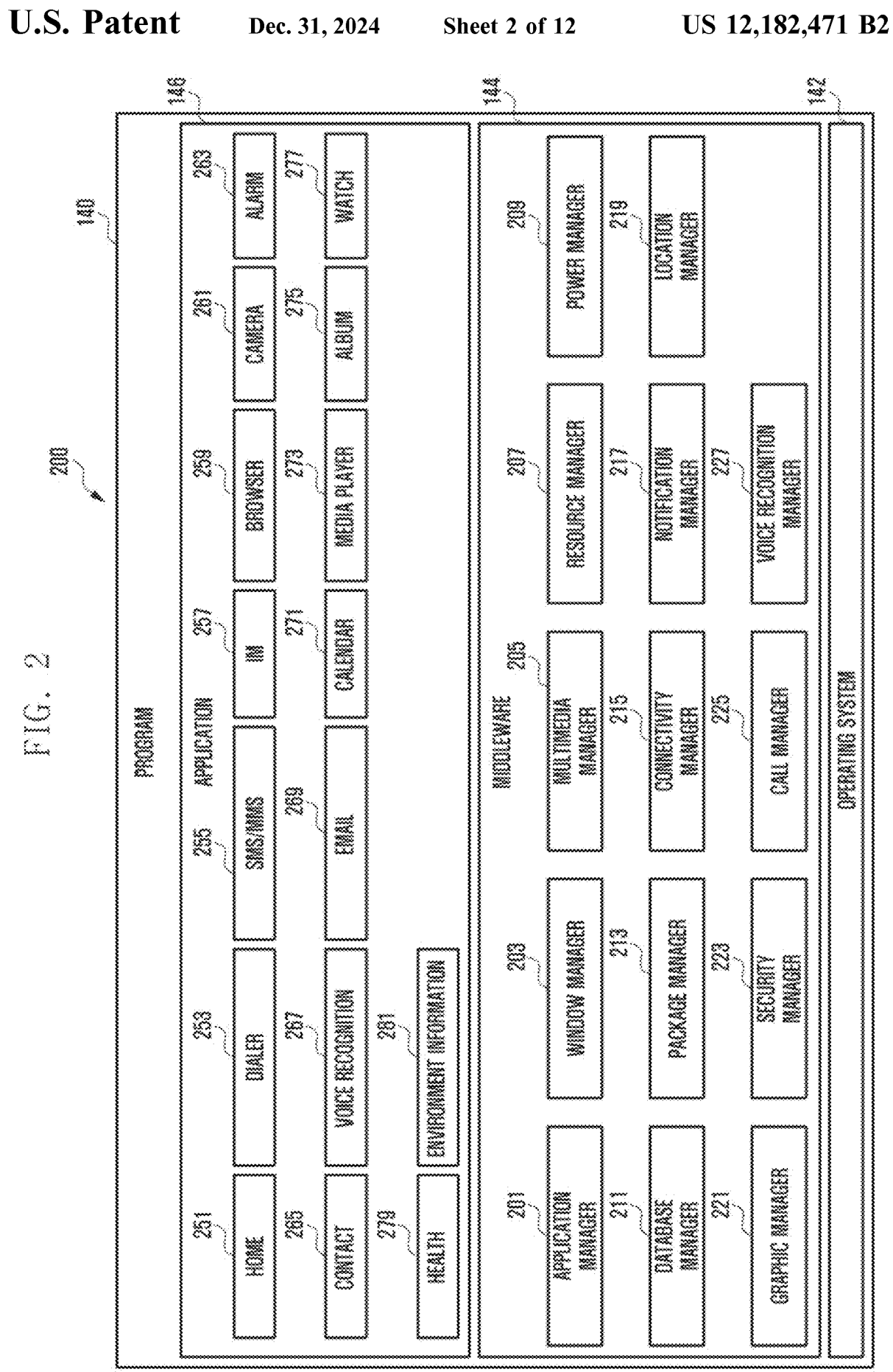
FIG. 2 is a block diagram of a program according to certain embodiments.

FIG. 2 is a block diagram 200 illustrating the program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
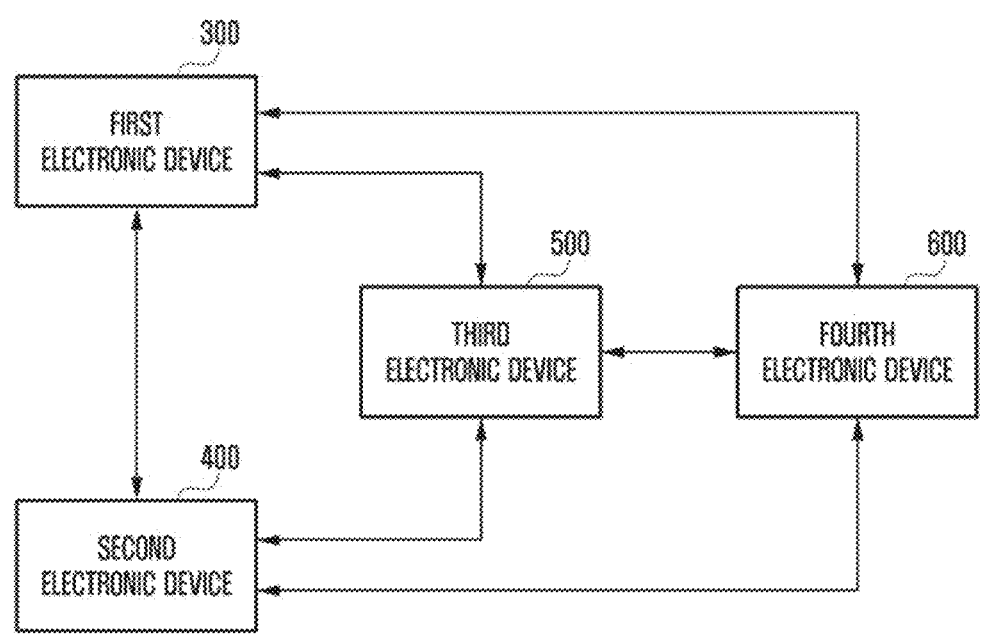
FIG. 3 is a block diagram illustrating a first electronic device, a second electronic device, a third electronic device, and a fourth electronic device according to certain embodiments of the disclosure.

FIG. 3 is a block diagram illustrating a first electronic device, a second electronic device, a third electronic device, and a fourth electronic device according to certain embodiments of the disclosure.

According to certain embodiments of the disclosure, a first electronic device 300 may be connected to various external electronic devices (such as, for example, a second electronic device 400, a third electronic device 500, or a fourth electronic device 600) through various communication schemes (such as, for example, Bluetooth, Bluetooth low energy (BLE), or Wi-Fi)), and may receive data from the connected external electronic devices and process the received data.

According to an embodiment, the first electronic device 300 may be wireless earphones. The first electronic device 300 may output data received from the forth electronic device 600 (such as, for example, the electronic device 101 of FIG. 1) by using an electronic component (such as, for example, the sound output device 155 of FIG. 1) included in the first electronic device 300.

According to certain embodiments of the disclosure, the second electronic device 400 may be connected to various external electronic devices (such as, for example, the first electronic device 300, the third electronic device 500, or the fourth electronic device 600) through various communication schemes (such as, for example, Bluetooth, Bluetooth low energy (BLE), or Wi-Fi)), and may receive data from the connected external electronic devices and process the received data.

According to an embodiment, the second electronic device 400 may be wireless earphones. The second electronic device 400 may output data (such as, for example, sound data) received from the forth electronic device 600 (such as, for example, the electronic device 101 of FIG. 1) by using an electronic component (such as, for example, the sound output device 155 of FIG. 1) included in the second electronic device 400.

According to certain embodiments of the disclosure, the second electronic device 400 may be connected to the first electronic device 300 through various communication schemes, and may receive data exchanged between the first electronic device 300 and another electronic device (such as, for example, the third electronic device 500 and/or the fourth electronic device 600) connected to the first electronic device 300 (such as, for example, audio data or control data for controlling the first electronic device 300 or the second electronic device 400) from the first electronic device 300.

According to certain embodiments of the disclosure, the second electronic device 400 may be connected to the first electronic device 300 through various communication schemes, and may receive information related to a communication connection (such as, for example, address information or clock information) between other electronic devices (such as, for example, the third electronic device 500 and/or the fourth electronic device 600) connected to the first electronic device 300 from the first electronic device 300. The second electronic device 400 may monitor (or sniff) data (such as, for example, audio data or control data) exchanged between the first electronic device 300 and another electronic device (such as, for example, the third electronic device 500 and/or the fourth electronic device 600) on the basis of the received information. For example, the second electronic device 400 may monitor the audio data which the fourth electronic device 600 transmits to the first electronic device 300 and output the same by using an electronic component (such as, for example, the sound output device 155 of FIG. 1) included in the second electronic device 400 even though there is no communication connection with the fourth electronic device 600.

According to certain embodiments of the disclosure, the third electronic device 500 may include a space into which the first electronic device 300 and the second electronic device 400 can be inserted. The third electronic device 500 may be physically or electrically connected to the first electronic device 300 and the second electronic device 400 in the state in which the first electronic device 300 and the second electronic device 400 are included. According to an embodiment, the first electronic device 300 and/or the second electronic device 400 may come in contact with the third electronic device 500 an thus may be electrically connected to the third electronic device 500. The third electronic device 500 may supply (or charge) power to the first electronic device 300 and/or the second electronic device 400 in the state in which the third electronic device is physically or electrically connected to the first electronic device 300 and the second electronic device 400.

According to certain embodiments of the disclosure, the third electronic device 500 may establish a communication channel with the first electronic device 300 and/or the second electronic device 400 to transmit or receive data in the state in which the third electronic device 500 is physically or electrically connected to the first electronic device 300 and the second electronic device 400. For example, the third electronic device 500 may transmit or receive information related to a charging state of the first electronic device 300 and/or the second electronic device 400 through the communication channel established with the first electronic device 300 and/or the second electronic device 400.

According to certain embodiments of the disclosure, the fourth electronic device 600 (such as, for example, the electronic device 101 of FIG. 1) may transmit various pieces of data, which can be provided to the user, to the first electronic device 300 and/or the second electronic device 400. According to an embodiment, the fourth electronic device 600 may transmit sound data, which can be provided to the user, to the first electronic device 300 and/or the second electronic device 400. The fourth electronic device 600 may receive state information of the first electronic device 300, the second electronic device 400, and/or the third electronic device 500 and display the state information on a display (such as, for example, the display device 160 of FIG. 1).

According to an embodiment, the first electronic device 300 and the second electronic device 400 may be implemented as wireless earphones, and the first electronic device 300 and/or the second electronic device 400 may be connected through various wireless communication schemes and may share or exchange various pieces of data (such as, for example, response signals corresponding to data for synchronizing sounds that can be output from wireless earphones, sound data received by the first electronic device 300 and/or the second electronic device 400, data which the first electronic device 300 and/or the second electronic device 400 exchange with the third electronic device 500 and/or the fourth electronic device 600, or data received by the first electronic device 300 and/or the second electronic device 400). The first electronic device 300 may store information utilized for the wireless communication connection with the second electronic device 400 in a memory (such as, for example, the memory 130 of FIG. 1). When the first electronic device 300 has a history of making the wireless communication connection with the second electronic device 400, the first electronic device may store an address of the second electronic device 400 in the memory (such as, for example, the memory 130 of FIG. 1). The second electronic device 400 may store information utilized for the 4wireless communication connection with the first electronic device 300 in a memory (such as, for example, the memory 130 of FIG. 1). When the second electronic device 400 has a history of making the wireless communication connection with the first electronic device 300, the second electronic device may store an address of the first electronic device 300 in the memory (such as, for example, the memory 130 of FIG. 1).

According to an embodiment, for the communication connection with the second electronic device 400, the first electronic device 300 may need information on the second electronic device 400 utilized for the communication connection between the first electronic device 300 and the second electronic device 400. The information on the second electronic device 400 is an address for the communication connection with the second electronic device 400 and may be an IP address or a MAC address. When there is no information on the second electronic device 400 in the memory (such as, for example, the memory 130 of FIG. 1), the first electronic device 300 may not establish the communication connection with the second electronic device 400. For example, when the second electronic device 400 has never been connected to the first electronic device 300, the information on the second electronic device 400 utilized for the communication connection between the first electronic device 300 and the second electronic device 400 may not exist in the memory (such as, for example, the memory 130 of FIG. 1) of the first electronic device 300. Hereinafter, embodiments in which the first electronic device 300 acquires information on the second electronic device 400 through the third electronic device 500 are described.

Figure 4:
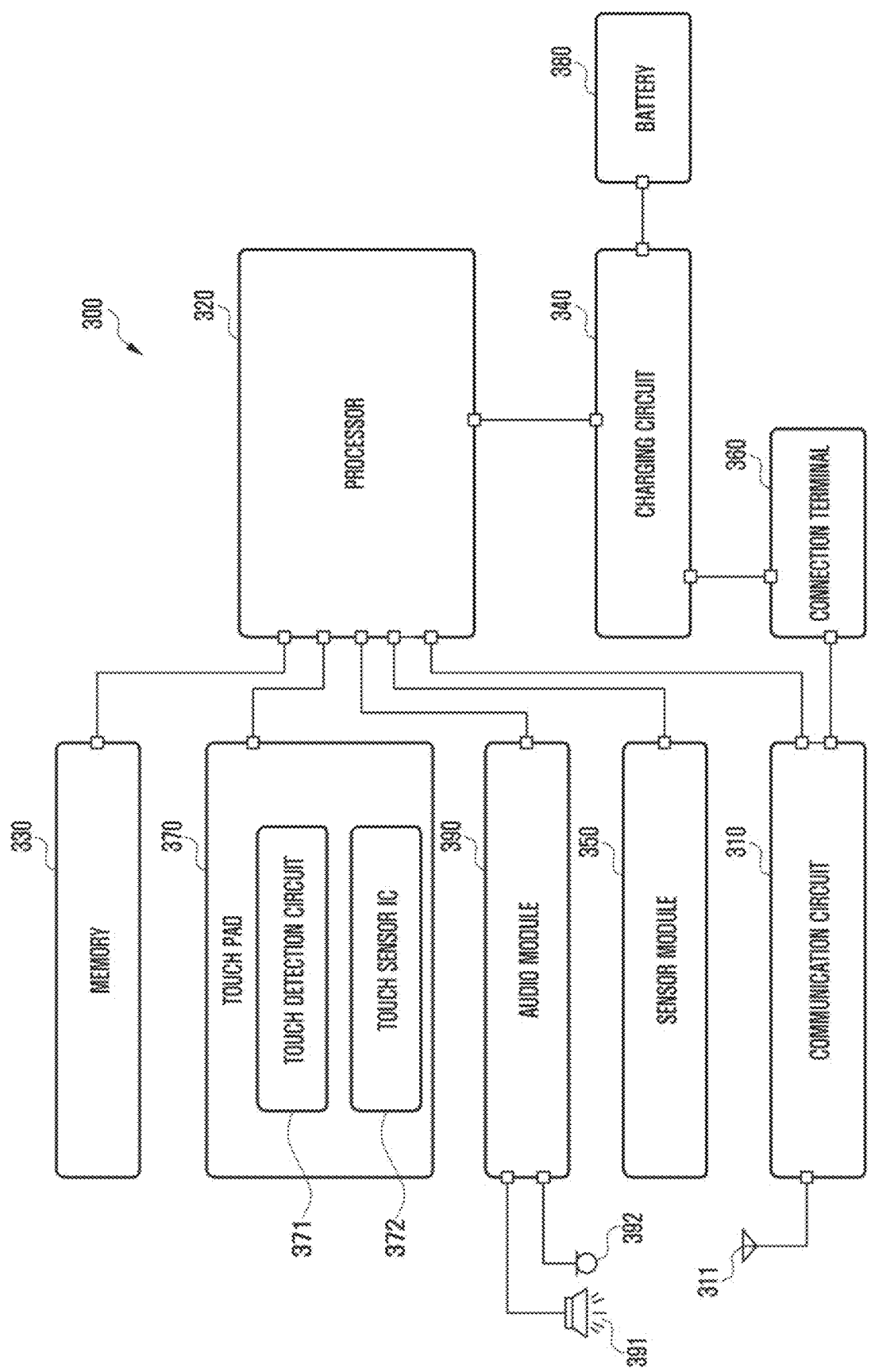
FIG. 4 is a block diagram illustrating the first electronic device according to certain embodiments of the disclosure.

FIG. 4 is a block diagram illustrating the first electronic device according to certain embodiments of the disclosure.

Referring to FIG. 4, the first electronic device 300 may include a communication circuit 310, at least one antenna 311, a processor 320, a memory 330, a charging circuit 340, a sensor module 350, a connection terminal 360, a touch pad 370, a battery 380, an audio module 390, a speaker 391, or a microphone 392. According to some embodiments, at least one of the elements of the first electronic device 300 in FIG. 3 may be omitted or one or more other elements may be added. According to some embodiments, some of the elements may be implemented as a single integrated circuit.

The processor 320 may control at least one other element (such as, or example, a hardware or software component) of the first electronic device 300 connected to the processor 320, by executing, for example, software and perform various data processing or calculations. According to an embodiment, as at least a part of the data processing or calculations, the processor 320 may load commands or data received from another element (such as, for example, the sensor module 350 or the communication circuit 310) to a volatile memory of the memory 330, process the commands or data stored in the volatile memory, and store resultant data in a nonvolatile memory.

The memory 330 may store various pieces of data used by, for example, at least one element (such as, for example, the processor 320 or the sensor module 350) of the first electronic device 300. The data may include, for example, software (such as, for example, program) and input data or output data for a command related thereto. The memory 330 may include a volatile memory or a nonvolatile memory. The program may be stored in the memory 330 as software and may include, for example, an operating system, middleware, or an application. The memory 330 may store instructions related to, for example, various operations performed by the processor 320.

The touch pad 370 may be, for example, a pointing device using one surface of the housing of the first electronic device 300 and may include a touch detection circuit 371 and a touch sensor integrated circuit (IC) (or a touch sensor) 372. According to an embodiment, the touch detection circuit 371 may include a conductive pattern located within the housing. A non-conductive cover may be implemented in the housing of the first electronic device 300 and may at least partially overlap the touch detection circuit 371. The cover including the conductive pattern located within the housing may be used as an input area (or a key area) for receiving or detecting a user input. According to an embodiment, the touch pad 370 may be implemented on the basis of a capacitive scheme. The touch sensor IC 372 (such as, for example, a touch controller IC) may apply a voltage to the touch detection circuit 371 and, the touch detection circuit 371 may form electromagnetic field. For example, when a user's finger comes in contact with one surface of the cover implemented in the housing of the first electronic device 300 or enters a threshold distance from one surface of the cover, a change in capacitance based on a change in the electromagnetic field may become a threshold value or more. When the change in capacitance is larger than or equal to the threshold value, the touch sensor IC 372 may generate an electrical signal related to coordinates as an effective user input and transfer the same to the processor 320. The processor 320 may recognize coordinates on the basis of the electrical signal received from the touch sensor IC 372. The touch detection circuit 371 and the touch sensor IC 372 may be collectively called a sensor circuit for touch detection. According to certain embodiments, the key area included in one surface of the non-conductive cover and the touch detection circuit 371 corresponding to the key area may be collectively called a 'touch key'. The touch pad 370 may contribute to the appearance of the first electronic device 300 having a sense of unify in sleek design by configuring the touch detection circuit to be suitable for the housing shape.

According to certain embodiments, the touch sensor IC 372 may convert an analog signal acquired through the touch detection circuit 371 into a digital signal. According to certain embodiments, the touch sensor IC 372 may perform various functions such as noise filtering, noise removal, or sensing data extraction in connection with the touch detection circuit 371. According to certain embodiments, the touch sensor IC 372 may include various circuits such as an analog-digital converter (ADC), a digital signal processor (DSP), and/or a micro control unit (MCU).

According to an embodiment, a user input for audio data (or audio content) may be generated through the touch pad 370. For example, functions of starting reproduction of audio data, pausing reproduction, stopping reproduction, controlling a reproduction speed, controlling a reproduction volume, or putting on mute may be executed on the basis of the user input through the touch pad 370. The first electronic device 300 may receive various gesture inputs through the key area included in one surface of the non-conductive cover by using a finger, and various functions for audio data may be performed on the basis of the gesture inputs. For example, when single tap is performed in the key area of the non-conductive cover, the processor 320 may reproduce audio data or temporarily stop the reproduction. For example, when double tap is performed in the key area of the non-conductive cover, the processor 320 may switch to reproduction of the next audio data. For example, when triple tap is performed in the key area of the non-conductive cover, the processor 320 may switch to reproduction of the previous audio data. For example, when swiping is performed in the key area of the non-conductive cover, the processor 320 may control a volume for reproduction of the audio data. The gesture input may be used for various other functions as well as the functions related to the audio data. For example, when a call is received and double tap is performed in the key area of the non-conductive cover, the processor 320 may connect the call.

According to certain embodiments, the touch pad 370 may further include a tactile layer (not shown). The touch pad 370 including the tactile layer may provide a tactile reaction to the user.

According to some embodiments, there may be a click button (not shown) aligned with the touch pad 370, and when pressure is applied to the non-conductive cover, an input which is the same as clicking a mouse button may be generated. According to an embodiment, the touch pad 370 may include a sensor circuit (such as, for example, a pressure sensor) (not shown) configured to measure intensity of force generated by a user input.

According to certain embodiments, the first electronic device 300 may further include various other input devices for receiving commands or data to be used for an element of the first electronic device 300 (such as, for example, the processor 320) from the outside (such as, for example, the user) of the first electronic device 300, not limiting to the touch pad 370. The input devices may have various types, for example, a physical button or an optical button.

The speaker 391 may output, for example, an audio signal to the outside of the first electronic device 300. A sound wave such as a sound or a voice may be introduced to the microphone 392 through a microphone hole, and the microphone 392 may generate an electrical signal therefor. The audio module 390 may convert a sound into an electric signal or, conversely, convert an electric signal into a sound. The audio module 390 may acquire a sound through the microphone 392 or output a sound through the speaker 391.

According to an embodiment, the audio module 390 may support an audio data collection function. The audio module 390 may reproduce the collected audio data. The audio module 390 may include an audio decoder, a digital-to-analog (D/A) converter, or an analog-to-digital (AD) converter. The audio decoder may convert audio data stored in the memory 330 into a digital audio signal. The D/A converter may convert the digital audio signal converted by the audio decoder into an analog audio signal. The speaker 391 may output the analog audio signal converted by the D/A converter. The A/D converter may convert the analog audio signal acquired through the microphone 392 into a digital audio signal.

The sensor module 350 may detect an operation state (such as, for example, power or temperature) of the first electronic device 300 or an external environment state (such as, for example, a user state) and generate an electrical signal or a data value corresponding to the detected state. According to an embodiment, the sensor module 350 may include an acceleration sensor, a gyro sensor, a geometric field sensor, a magnetic sensor, a proximity sensor, a temperature sensor, a gesture sensor, a grip sensor, or a biometric sensor.

For example, the first electronic device 300 may include an optical signal at least partially located within the housing or on one surface of the housing. When the optical signal is located within the housing, a partial area of the housing facing the optical sensor may be implemented to allow light pass therethrough or may include opening. The optical sensor may include a light emitter (such as, for example, light emitting diodes (LEDs) for outputting light in at least one wavelength band or a light receiver (such as, for example, photodiodes) for receiving light in one or more wavelength bands to generate an electrical signal. According to an embodiment, the optical sensor may be a sensor for detecting wearing. According to an embodiment, the optical sensor may be a biometric sensor. In the state in which the first electronic device 300 is worn on user's ears, the light output from the light emitter of the optical sensor may be reflected from a user's skin and introduced to the light receiver of the optical sensor. The light receiver of the optical sensor may provide an electrical signal based on the introduced light to the processor 320. The processor 320 may transmit the electrical signal acquired from the optical signal to an external electronic device (such as, for example, a smartphone) (such as, for example, the fourth electronic device 600 of FIG. 3) through the communication circuit 310. The external electronic device may acquire various pieces of biometric information such as a heart rate or skin temperature on the basis of the electrical signal acquired from the first electronic device 300. According to some embodiments, the processor 320 may acquire biometric information on the basis of the electrical signal acquired from the optical sensor, and transmit the acquired biometric information to the external electronic device through the communication circuit 310 or output the same through the speaker 391.

According to certain embodiments, information or a signal indicating whether the first electronic device 300 is coupled to the user's ears may be acquired through the sensor module 350. According to certain embodiments, information or a signal indicating whether the first electronic device 300 is coupled to an external device (such as, for example, a charging device) (such as, for example, the electronic device 500 of FIG. 3) may be acquired through the sensor module 350.

According to certain embodiments (not shown), the first electronic device 300 may include a member to be detected, corresponding to a sensor of the external electronic device (such as, for example, the charging device). For example, the external electronic device may include a hall IC disposed on a mounting unit, and the first electronic device 300 may include a magnet (or magnetic substance). When the first electronic device 300 is coupled to the mounting unit of the external electronic device, the hall IC of the external electronic device may detect the magnet disposed on the first electronic device 300 and transfer an electrical signal for coupling between the external electronic device and the first electronic device 300 to the processor 320.

The connection terminal 360 may include, for example, a connector through which the first electronic device 300 can be electrically connected to the external electronic device (such as, for example, the smartphone or the charging device). According to an embodiment, the connection terminal 360 may include, for example, a USB connector or an SD card connector.

According to certain embodiments, the connection terminal 360 may include at least one contact (or terminal) disposed on an external surface of the housing. For example, when the first electronic device 300 is mounted to the mounting unit (not shown) of the external electronic device, at least one contact of the first electronic device 300 may be electrically connected to at least one contact (such as, for example, a flexible terminal such as a pogo pin) disposed on a mounting unit of the external electronic device. According to an embodiment, the connection terminal 360 may receive power for charging the battery 380 from the external electronic device and transfer the power to the charging circuit 340. According to an embodiment, the first electronic device 300 may perform power line communication (PLC) with the external electronic device (such as, for example, the charging device) through the connection terminal 360.

The charging circuit 340 may manage, for example, the power supplied to the first electronic device 300. According to an embodiment, the charging circuit 340 may be implemented as at least a part of a power management integrated circuit (PMIC).

The battery 380 may supply, for example, power to at least one element of the first electronic device 300. According to an embodiment, the battery 380 may include a rechargeable secondary cell.

The communication circuit 310 may support establishment of a direct (such as, for example, wired) communication channel or a wireless communication channel between, for example, the first electronic device 300 and an external electronic device (such as, for example, a server, a smartphone, a personal computer (PC), a personal digital assistant (PDA), or an access point) and communication through the established communication channel. According to certain embodiments, the communication circuit 310 may operate independently from the processor 320 and may include one or more communication processors supporting direct (such as, for example, wired) communication or wireless communication.

The communication circuit 310 may transmit signals or power to an external electronic device or receive the same from the external electronic device through, for example, at least one antenna (or antenna radiator) 311. According to an embodiment, the communication circuit 310 may include a wireless communication module (such as, for example, a short-range wireless communication module, or a global navigation satellite system (GNSS) communication module) or a wired communication module (such as, for example, a local area network (LAN) communication module or a power line communication module). Among the communication modules, the corresponding communication module may communicate with the external electronic device through a first network (such as, for example, a short-range communication network such as Bluetooth, Bluetooth low energy (BLE), near filed communication (NFC), wireless fidelity (Wi-Fi) direct, or infrared data association (IrDA)) or a second network (such as, for example, a long-range communication network such as Internet or a computer network (such as, for example, a LAN or wide area network (WAN))). Such various types of communication modules may be integrated into one element (such as, for example, a single chip) or may be implemented as a plurality of separate elements (such as, for example, a plurality of chips). According to certain embodiments, the first electronic device 300 may include a plurality of antennas 311, and the communication circuit 310 may select at least one antenna suitable for a communication scheme used in the communication network from the plurality of antennas 311. A signal or power may be transmitted or received between the communication circuit 310 and the external electronic device through at least one selected antenna.

According to an embodiment, all or some of the operations performed by the first electronic device 300 may be performed by at least one external electronic device (such as, for example, a smartphone). For example, when the first electronic device 300 is utilized to perform a function or a service automatically or in response to a request from the user or another device, the first electronic device 300 may make a request for performing at least some of the function or the service to at least one external electronic device additionally or instead of performing the function or the service by itself. At least one external electronic device receiving the request may perform at least some of the requested function or service or the additional function or service related to the request and transfer the result thereof to the first electronic device 300. The first electronic device 300 may provide the result or additionally process and provide the result as at least a part of the response to the request.

According to certain embodiments, a command or data received by the processor 320 may be transmitted or received between the first electronic device 300 and the external electronic device (such as, for example, the smartphone) through a server connected to the second network (such as, for example, the long-distance communication network such as the Internet or the computer network (such as, for example, LAN or WAN)).

According to an embodiment, the processor 320 may be configured to control flow of various signals related to audio data and collection and output of information. The processor 320 may be configured to receive audio data from an external electronic device (such as, for example, a server, a smartphone, a PC, a PDA, or an access point) through the communication circuit 310 and store the received audio data in the memory 330. The processor 320 may be configured to receive nonvolatile audio data (or downloaded audio data) from the external electronic device and store the received nonvolatile audio data in a nonvolatile memory. The processor 320 may be configured to receive volatile audio data (or streaming audio data) from the external electronic device and store the received volatile audio data in the volatile memory.

According to an embodiment, the processor 320 may be configured to reproduce audio data (such as, for example, nonvolatile audio data or volatile audio data) stored in the memory 330 and output the audio data through the speaker 391. For example, the audio module 390 may decode the audio data to generate an audio signal which can be output through the speaker 391 (such as, for example, reproduce the audio data) and output the generated audio signal through the speaker 391.

According to certain embodiments, the processor 320 may be configured to receive the audio signal from the external electronic device and output the received audio signal through the speaker 391. For example, the external electronic device (such as, for example, an audio reproduction device) may decode audio data to generate an audio signal and transmit the generated audio signal to the first electronic device 300.

According to certain embodiments, a mode in which the first electronic device 300 reproduces volatile audio data or nonvolatile audio data stored in the memory 330 and outputs the audio data through the speaker 391 may be temporarily stopped when a state in which the first electronic device 300 is not coupled to a user's ears is identified through the sensor module 350. When the state in which the first electronic device 300 is coupled to the user's ears is identified through the sensor module 350, the mode may be resumed.

According to certain embodiments, a mode in which an audio signal is received from an external electronic device and is output through the speaker 391 may be temporarily stopped when the state in which the first electronic device 300 is not coupled to the user's ears is identified through the sensor module 350. When the state in which the first electronic device 300 is coupled to the user's ears is identified through the sensor module 350, the mode may be resumed.

According to certain embodiments, when the first electronic device 300 makes a communication connection with another ear first electronic device (not shown), one ear first electronic device may be a master device and the other ear first electronic device may be a slave device. For example, the first electronic device 300 corresponding to the master device may not only output an audio signal received from the external electronic device (such as, for example, the smartphone) to the speaker 391 but also transmit the audio signal to the other first electronic device. The other ear first electronic device may be implemented to be substantially the same as the first electronic device 300 and output the audio signal received from the first electronic device 300 through the speaker.

According to certain embodiments, the first electronic device 300 may provide a voice recognition function for generating a voice command from an analog audio signal received through the microphone 392. The voice command may be used for various functions related to audio data.

According to certain embodiments, the first electronic device 300 may include a plurality of microphones (such as, for example, the microphone 392) to detect a direction of a sound. At least some of the plurality of microphones may be used for nose cancelling.

According to certain embodiments, the first electronic device 300 may further include various modules according to a provision form thereof. Since such elements may be variously modified according to the trend toward convergence of digital devices, the elements cannot all be enumerated, but the first electronic device 300 may further include elements equivalent to the aforementioned elements. Further, specific elements of the first electronic device 300 according to an embodiment can be excluded from the above-described elements according to a provision form thereof or can be replaced with other elements. This may be easily understood by those skilled in the art. According to certain embodiments of the disclosure, the communication circuit 310 may transmit or receive data through wireless communication with the second electronic device 400, the third electronic device 500, and/or the fourth electronic device 600. According to an embodiment, the communication circuit 310 may support wireless communication (such as, for example, Bluetooth, Bluetooth low energy, or Wi-Fi) which can be supported by the second electronic device 400, the third electronic device 500, or the fourth electronic device 600 and perform various operations (such as, for example, output of an advertisement signal, output of a paging signal, generation of a wireless communication channel, or release of a wireless communication channel) using supported wireless communication.

According to certain embodiments of the disclosure, the memory 330 may store data received through the communication circuit 310 and/or the charging circuit 340 or information stored while the first electronic device 300 is manufactured. According to an embodiment, the memory 330 may store information for a wireless communication connection between the second electronic device 400, the third electronic device 500, and/or the fourth electronic device 600, and the first electronic device 300. For example, the memory 330 may store address information of the second electronic device 400, address information of the third electronic device 500, or address information of the fourth electronic device 600.

According to certain embodiments of the disclosure, the charging circuit 340 may perform an operation related to reception of power transmitted by the third electronic device 500 (such as, for example, control of a reception speed of power or control of an operation of transmitting received power to a battery (such as, for example, the battery 189 of FIG. 1) of the first electronic device 300) through an electrical connection between the first electronic device 300 and the third electronic device 500. The first electronic device 300 may be electrically connected to the third electronic device 500 through various schemes. According to an embodiment, the first electronic device 300 may be electrically connected to the third electronic device 500 through contact between a terminal of the first electronic device 300 (such as, for example, the connection terminal 178 of FIG. 1 or a terminal 720 of FIG. 7) and a terminal of the third electronic device 500. According to the generation of the electrical connection between the terminal of the first electronic device 300 (such as, for example, the terminal 720 of FIG. 7) and the terminal of the third electronic device 500 (such as, for example, the terminal 710 of FIG. 7), the charging circuit 340 may receive power from the third electronic device 500 and a communication channel between the first electronic device 300 and the third electronic device 500 may be established. The charging circuit 340 may exchange various pieces of data with the third electronic device 500 through the communication channel established between the first electronic device 300 and the third electronic device 500. The charging circuit 340 may transmit the data received from the third electronic device 500 to the processor 320. The establishment of the communication channel according to the electrical connection between the terminal of the first electronic device 300 and the terminal of the third electronic device 500 is described below with reference to FIGS. 6 to 7.

According to certain embodiments of the disclosure, the communication channel between the first electronic device 300 and the third electronic device 500 may be a communication channel in various types which can be implemented according to the electrical connection between the first electronic device 300 and the third electronic device 500. According to an embodiment, the electrical connection between the first electronic device 300 and the third electronic device 500 may be made due to contact between the terminal of the first electronic device 300 and the terminal of the third electronic device 500. According to an embodiment, the communication channel between the first electronic device 300 and the third electronic device 500 may be a communication channel implemented for power line communication (PLC). According to another embodiment, the electrical connection between the first electronic device 300 and the third electronic device 500 may be a wireless communication (such as, for example, Bluetooth, BLE, or NFC) connection made without any contact between the first electronic device 300 and the third electronic device 500 through terminals.

The first electronic device 300 and the third electronic device 500 may transmit or receive state information of the first electronic device (such as, for example, a charging state of the first electronic device 300 (remaining capacity state, charging voltage, or temperature) or information on another electronic device connected to the first electronic device 300), state information of the second electronic device 400 (such as, for example, charging state information of the second electronic device 400), or state information of the third electronic device 500 (such as, for example, whether the third electronic device 500 is charged or temperature information of the third electronic device 500) through the communication channel established by the electrical connection between the first electronic device 300 and the third electronic device 500.

According to certain embodiments of the disclosure, the processor 320 may be operatively connected to various electronic elements (such as, for example, the communication circuit 310, the memory 330, and/or the charging circuit 340) included in the first electronic device 300 and control various elements operatively connected to the processor 320.

According to certain embodiments of the disclosure, through the charging circuit 340, the processor 320 may receive, from the third electronic device 500, information on the second electronic device 400 for making the communication connection between the first electronic device 300 and the second electronic device 400 through the communication channel established according to the electrical connection between the first electronic device 300 and the third electronic device 500.

According to certain embodiments of the disclosure, the information on the second electronic device 400 may be address information of the second electronic device 400 utilized for performing wireless communication between the first electronic device 300 and the second electronic device 400. For example, the address information of the second electronic device 400 may include at least one of an IP address of the second electronic device 400, a MAC address of the second electronic device 400, or a Bluetooth address of the second electronic device 400.

According to certain embodiments of the disclosure, the processor 320 may receive information related to the third electronic device 500 (such as, for example, identification information of the third electronic device 500) along with the information on the second electronic device 400 from the third electronic device 500.

According to certain embodiments of the disclosure, the third electronic device 500 may receive the information on the second electronic device 400 for making the communication connection between the first electronic device 300 and the second electronic device 400 from the second electronic device 400. The third electronic device 500 may receive the information on the second electronic device 400 from the second electronic device 400 through a scheme that is the same as the above-described scheme (the scheme using the communication channel established through the physical or electrical connection between the first electronic device 300 and the third electronic device 500). The operation of the third electronic device 500 is described below with reference to FIG. 5.

According to certain embodiments of the disclosure, the first electronic device 300 may transmit information on the first electronic device 300 for making the communication connection between the first electronic device 300 and the second electronic device 400 to the second electronic device 400 through the third electronic device 500. The processor 320 may control the charging circuit 340 to transmit the information on the first electronic device 300 to the third electronic device 500 through the communication channel established between the first electronic device 300 and the third electronic device 500. The charging circuit 340 may transmit the information on the first electronic device 300 to the third electronic device 500 through the communication channel established through the electrical connection between the first electronic device 300 and the third electronic device 500 (such as, for example, contact between terminals).

According to certain embodiments of the disclosure, the information on the first electronic device 300 may be address information of the first electronic device 300 utilized for the connection through wireless communication between the first electronic device 300 and the second electronic device 400. For example, the address information of the first electronic device 300 may include at least one of an IP address of the first electronic device 300, a MAC address of the first electronic device 300, or a Bluetooth address of the first electronic device 300.

According to certain embodiments of the disclosure, the operation in which the first electronic device 300 transmits data (such as, for example, address information of the first electronic device 300) to the third electronic device 500 and the operation of receiving data (such as, for example, address information on the second electronic device 400) from the third electronic device 500 may use a biphase mark code scheme. For example, when transmitting the information on the first electronic device 300 to the third electronic device 500, the processor 320 may control the charging circuit 340 to perform transmission by controlling the current of a signal including the information on the first electronic device 300. In another example, when receiving the information on the second electronic device 400 from the third electronic device 500, the processor 320 may control the charging circuit 340 to receive the information on the second electronic device 400 by controlling the voltage of a signal including the information on the second electronic device 400. In the above scheme, the signal exchanged between the first electronic device 300 and the third electronic device 500 may not generate interference.

According to certain embodiments of the disclosure, a message including information on the first electronic device 300 and information on the second electronic device 400 exchanged through the third electronic device 500 may include a preamble indicating beginning of data transmission, a header of the data, and the data. The header of the data may include a header type, a parity bit for verifying whether the header has an error, and a start bit indicating the beginning of data. The data may include a data message including information on the first electronic device 300 or information on the second electronic device 400, a parity bit for verifying whether data has an error, a checksum for verifying integrity of data, and a stop bit indicating the end of data.

According to certain embodiments, after receiving the information on the first electronic device 300, the third electronic device 500 may transmit a message indicating reception of the information on the first electronic device 300 to the first electronic device 300.

According to certain embodiments, the third electronic device 500 receiving the information on the first electronic device 300 may transmit the information on the first electronic device 300 to the second electronic device 400 through the communication channel established by the electrical connection between the second electronic device 400 and the third electronic device 500.

According to certain embodiments of the disclosure, the processor 320 may differently configure a transmission period of the information on the first electronic device 300 depending on various conditions (such as, for example, a condition related to time and a condition related to a battery state of the first electronic device 300). For example, the processor 320 may configure the transmission period of the first electronic device 300 to be relatively longer in response to identification that the remaining battery capacity of the first electronic device 300 is equal to or lower than a predetermined value.

According to certain embodiments of the disclosure, the processor 320 may perform the operation of transmitting the information on the first electronic device 300 or the operation of receiving the information on the second electronic device 400 in response to identification that a predetermined condition is satisfied. According to an embodiment, the processor 320 may perform the operation of transmitting the information on the first electronic device 300 or the operation of receiving the information on the second electronic device 400 in response to reception of a signal making a request for performing the operation of receiving the information on the second electronic device 400 or the operation of transmitting the information on the first electronic device 300 from the third electronic device 500 and/or the fourth electronic device 600. The third electronic device 500 may transmit a signal making a request for performing the operation of receiving the information on the second electronic device 400 or the operation of transmitting the information on the first electronic device 300 to the first electronic device 300 in response to satisfaction of a predetermined condition (such as, for example, a condition of receiving a user input making a request for updating information on an electronic device to be paired, the electronic device being implemented to be input onto a button of the third electronic device 500, a condition of removing the first electronic device 300 or the second electronic device 400 from the third electronic device 500 by a predetermined number of times or more, or a condition of opening or closing a case cover of the third electronic device 500 by a predetermined number of times or more).

Figure 6:
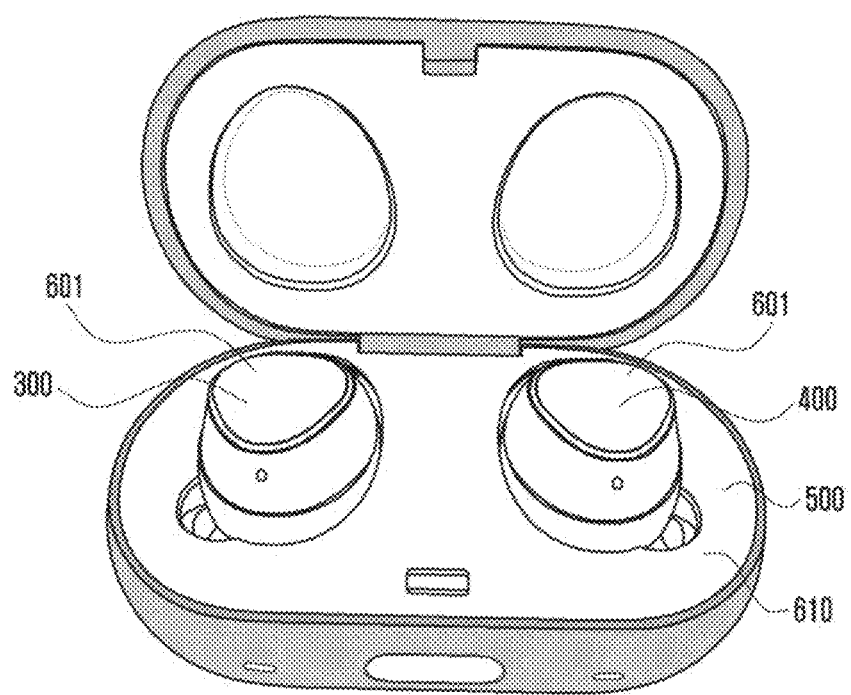
FIG. 6 illustrates the first electronic device, the second electronic device, and the third electronic device according to certain embodiments of the disclosure.

According to another embodiment, the processor 320 may perform the operation of transmitting information on the first electronic device 300 or the operation of receiving the second electronic device 400 in response to reception of a user input that satisfies a predetermined condition (such as, for example, a touch input time or a touch input area) in a touch sensor implemented on the first electronic device 300 (such as, for example, the touch sensor 601 of FIG. 6).

According to certain embodiments of the disclosure, the first electronic device 300 may receive the information on the second electronic device 400 from the third electronic device 500 and thus receive the information on the second electronic device 400 even in the state in which the wireless communication connection between the second electronic device 400 and the first electronic device 300 is not made. The charging circuit 340 may receive the information on the second electronic device 400 through the communication channel established between the first electronic device 300 and the third electronic device 500 and transmit the received information on the second electronic device 400 to the processor 320.

According to certain embodiments of the disclosure, the processor 320 may store the information on the second electronic device 400 received through the communication channel established between the first electronic device 300 and the third electronic device 500 in the memory 330. According to an embodiment, the processor 320 may store the information on the second electronic device 400 in a nonvolatile area implemented in a part of the memory 330. The processor 320 may reboot the first electronic device 300 after storing the information on the second electronic device 400.

According to certain embodiments of the disclosure, the processor 320 may store information on an electronic device to be paired in the memory 330. The information on the electronic device to be paired may be information on another electronic device (such as, for example, the second electronic device 400) to be connected to the first electronic device 300 through the communication circuit 310 as the first electronic device 300 switches from the inactive state to the active state. The electronic device to be connected to the first electronic device 300 may be an electronic device transmitting (or exchanging) data received from an external electronic device (such as, for example, the fourth electronic device 600) to which the first electronic device 300 transmits various pieces of data including audio data or performing synchronization with the first electronic device 300 to output the received data. For example, when the first electronic device 300 is a right earphone, the other electronic device (such as, for example, the second electronic device 400) may be a left earphone. The processor 320 may update the stored information on the electronic device to be paired, on the basis of the received information on the second electronic device 400. The operation of updating the information on the electronic device to be paired may be an operating of changing the conventionally stored information on the electronic device to the information on the second electronic device 400, and the processor 320 may control the communication circuit 310 to attempt pairing with the second electronic device 400 after the first electronic device 300 switches to the active state on the basis of the updated information.

According to certain embodiments of the disclosure, after storing the information on the second electronic device 400 in the memory 330, the processor 320 may stand by without the update of the information on the electronic device to be paired. The processor 320 may update the information on the electronic device to be paired on the basis of the information on the second electronic device 400 in response to identification of satisfaction of a condition related to the update of the information on the electronic device to be paired.

According to certain embodiments of the disclosure, the condition related to the update of the information on the electronic device to be paired may be a condition by which the processor 320 receives a signal making a request for updating the information on the electronic device to be paired.

According to certain embodiments, the processor 320 may update the information on the electronic device to be paired on the basis of the information on the second electronic device 400 in response to reception of the signal making the request for updating the information on the electronic device to be paired from the second electronic device 400, the third electronic device 500, and/or the fourth electronic device 600. For example, the processor 320 may receive the signal making the request for updating the information on the electronic device to be paired from the second electronic device 400 and/or the fourth electronic device 600 connected through the communication circuit 310. In another example, the processor 320 may receive the signal making the request for updating the information on the electronic device to be paired through the communication circuit 310 and/or the charging circuit 340 on the basis of the information on the second electronic device 400 received from the third electronic device 500 and control the communication circuit 310 to establish the communication connection with the second electronic device 400.

According to certain embodiments of the disclosure, the third electronic device 500 may transmit the signal making the request for updating the information on the electronic device to be paired to the first electronic device 300 in response to identification of satisfaction of a predetermined condition (such as, for example, a condition of receiving a user input made on a button implemented in the third electronic device 500, a condition of removing the first electronic device 300 or the second electronic device 400 from the third electronic device 500 by a predetermined number of times or more, or a condition of opening or closing a case cover implemented in the third electronic device 500 by a predetermined number of times of more).

According to certain embodiments of the disclosure, the fourth electronic device 600 may transmit the signal making the request for updating the information on the electronic device to be paired to the first electronic device 300 through short-range communication (such as, for example, Bluetooth, Bluetooth low energy (BLE), or NFC) in response to identification of satisfaction of a predetermined condition (such as, for example, reception of a user input making a request for an update on the display).

According to certain embodiments of the disclosure, the fourth electronic device 600 may transmit the signal making the request for updating the information on the electronic device to be paired to the second electronic device 400 through short-range communication (such as, for example, Bluetooth, Bluetooth low energy (BLE), or NFC) in response to identification of satisfaction of a predetermined condition (such as, for example, reception of a user input making a request for an update on the display or transmission of information indicating that another electronic device connected to the fourth electronic device 600 receives a user input making a request for an update to the fourth electronic device 600). The second electronic device 400 may output a sound corresponding to the signal making the request for updating the information on the electronic device to be paired to the speaker in response to reception of the signal making the request for updating the information on the electronic device to be paired. The first electronic device 300 may receive the output sound through a microphone included in the first electronic device 300 (such as, for example, the input device 150 of FIG. 1) and update the information on the electronic device to be paired.

According to certain embodiments of the disclosure, the processor 320 may determine whether the electronic device to be paired is updated on the basis of identification information of the electronic device (such as, for example, the third electronic device 500) capable of supplying power to the first electronic device 300, stored in the memory 330 and identification information of the electronic device capable of supplying power to the second electronic device 400.

According to an embodiment, the processor 320 may update the information on the electronic device to be paired on the basis of the information on the second electronic device 400 in response to identification that the identification information of the electronic device (such as, for example, the third electronic device 500) capable of supplying power to the second electronic device 400 is not stored in the second electronic device 400. For example, non-storage of identification information of the electronic device capable of supplying power by the second electronic device 400 may mean that the second electronic device 400 is in a factory reset state and the second electronic device 400 in the factory reset state is initially connected to the third electronic device 500.

According to an embodiment, the processor 320 may identify the identification information stored in the second electronic device 400 in response to identification that the identification information of the electronic device (such as, for example, the third electronic device 500) capable of supplying power to the second electronic device 400 is stored in the second electronic device 400.

According to an embodiment, the processor 320 may receive the identification information of the electronic device (such as, for example, the third electronic device 500) capable of supplying power transmitted by the second electronic device 400 through the communication circuit 310. According to another embodiment, the second electronic device 400 may transmit the identification information of the electronic device capable of supplying power to the third electronic device 500, and the processor 320 may receive the identification information of the electronic device (such as, for example, the third electronic device 500) capable of supplying power through the charging circuit 340.

According to another embodiment, the first electronic device 300 and/or the second electronic device 400 may receive identification information of the electronic device (such as, for example, the identification information of the third electronic device) capable of supplying power from the third electronic device 500 through various communication means (such as, for example, NFC, Bluetooth, BLE, or PLC) in the state in which the first electronic device 300 and/or the second electronic device 400 are physically/electrically connected to the third electronic device 500. The first electronic device 300 and/or the second electronic device 400 may broadcast a signal (such as, for example, an advertising signal or an extended inquiry response (EIR) signal) including the received identification information of the third electronic device 500. The first electronic device 300 and/or the second electronic device 400 may broadcast the received signal including the identification information of the third electronic device 500 to be equal to or smaller than a preset size. The operation of broadcasting the signal including the identification information of the third electronic device 500 received to be equal to or smaller than the preset size in the state in which the first electronic device 300 and the second electronic device 400 are inserted into the third electronic device 500 may prevent a situation in which other external electronic devices existing in the outside of the third electronic device 500 receive the signal including the identification information of the third electronic device 500 and allow the first electronic device 300 and/or the second electronic device 400 to receive the signal including the identification information of the third electronic device 500.

The second electronic device 400 and/or the first electronic device 300 may compare the identification information of the third electronic device included in the received signal and the identification information of the electronic device capable of supplying power, stored in the memory. According to an embodiment, when power is being received from the third electronic device 500, the first electronic device 300 and/or the second electronic device 400 may compare the identification information of the third electronic device and the identification information of the electronic device capable of supplying power, stored in the memory. When power is not received from the third electronic device 500, the first electronic device 300 and/or the second electronic device 400 may not compare the identification information of the third electronic device and the identification information of the electronic device capable of supplying power, stored in the memory.

According to certain embodiments of the disclosure, the processor 320 may compare identification information of the electronic device capable of supplying power, stored in the first electronic device 300 (hereinafter, referred to as first identification information) and identification information of the electronic device capable of supplying power, stored in the second electronic device 400 (hereinafter, referred to as second identification information).

According to an embodiment, the processor 320 may not update the information on the electronic device to be paired in response to identification that the first identification information and the second identification information are the same as each other, and may control the charging circuit 340 to perform charging using the power transmitted by the third electronic device 500. The processor 320 may determine whether to update the information on the electronic device to be paired according to whether a condition related to the update of the information on the electronic device to be paired is satisfied.

According to an embodiment, the processor 320 may update the information on the electronic device to be paired in response to identification that the first identification information and the second identification information are the same as each other in the state in which a plurality of pieces of first identification information are stored in the memory 330.

According to an embodiment, the processor 320 may not update the information on the electronic device to be paired in response to identification that the first identification information and the second identification information are different from each other. In this case, the processor 320 may control the charging circuit 340 to perform charging using the power transmitted by the third electronic device 500. The processor 320 may determine whether to update the information on the electronic device to be paired according to whether a condition related to the update of the information on the electronic device to be paired (such as, for example, a condition indicating whether the processor 320 receives a signal making a request for updating the information on the electronic device to be paired from the second electronic device 400, the third electronic device 500, and/or the fourth electronic device 600) is satisfied.

According to an embodiment, the processor 320 may receive an indicator indicating whether there is identification information of the electronic device capable of supplying power to the second electronic device 400 and the identification information of the electronic device capable of supplying power from the second electronic device 400. For example, the processor 320 may receive the indicator or the identification information from the second electronic device 400 through the third electronic device 500. In another example, the processor 320 may receive an indicator or identification information broadcasted by the second electronic device 400 through the communication circuit 310.

The elements (such as, for example, the communication circuit 310, the processor 320, the memory 330, and/or the charging circuit 340) and the embodiment illustrated in FIG. 4 have been described through an example of the first electronic device 300, but may be equally applied to the second electronic device 400.

Figure 5:
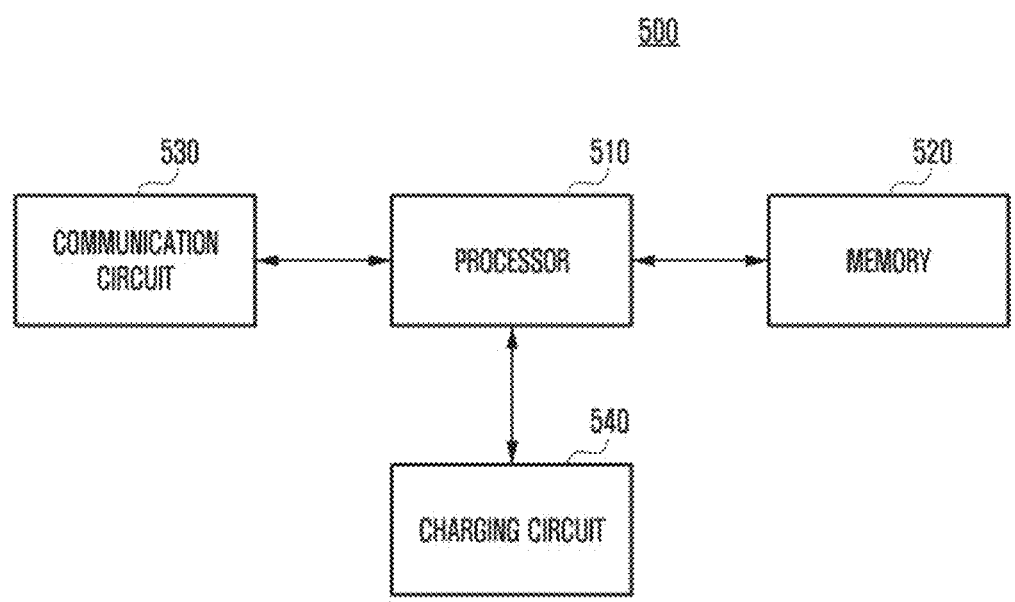
FIG. 5 is a block diagram illustrating the third electronic device according to certain embodiments of the disclosure.

FIG. 5 is a block diagram illustrating the third electronic device according to certain embodiments of the disclosure.

Referring to FIG. 5, the third electronic device (such as, for example, the third electronic device 500 of FIG. 3) according to certain embodiments of the disclosure may include a processor 510 (such as, for example, the processor 120 of FIG. 1), a memory 520 (such as, for example, the memory 130 of FIG. 1), a communication circuit 530 (such as, for example, the wireless communication module 192 of FIG. 1), and/or a charging circuit 540.

According to certain embodiments of the disclosure, the communication circuit 530 may transmit and/or receive data via wireless communication with the first electronic device (such as, for example, the first electronic device 300 of FIG. 3), the second electronic device (such as, for example, the second electronic device 400 of FIG. 3), and/or the fourth electronic device (such as, for example, the fourth electronic device 600 of FIG. 3). According to an embodiment, the communication circuit 530 may support wireless communication (such as, for example, Bluetooth, Bluetooth low energy, NFC, or Wi-Fi) which can be supported by the first electronic device 300, the second electronic device 400, or the fourth electronic device 600, and the communication circuit 530 may perform various operations (such as, for example, output of an advertisement signal, output of a paging signal, establishment of a wireless communication channel, or release of a wireless communication channel) using supported wireless communication. The communication circuit 530 may transmit a signal for controlling the operation of the first electronic device 300 and/or the second electronic device 400 (such as, for example, the operation of outputting content of the first electronic device 300 and/or the second electronic device 400) to the first electronic device 300 and/or the second electronic device 400.

According to certain embodiments of the disclosure, the charging circuit 540 may perform the operation related to transmission of power to the first electronic device 300 (such as, for example, control of a transmission speed of power) through the physical/electrical connection between the first electronic device 300 and the third electronic device 500. The third electronic device 500 may be physically/electrically connected to the first electronic device 300 through various schemes. According to an embodiment, the third electronic device 500 may include a space (such as, for example, a groove 704 of FIG. 7) into which the first electronic device 300 and/or the second electronic device 400 can be inserted. When the first electronic device 300 or the second electronic device 400 are inserted into the third electronic device 500, the electrical connection may be made between the terminal of the third electronic device 500 (such as, for example, a terminal 710 of FIG. 7) and the terminal of the first electronic device 300 (such as, for example, a terminal 720 of FIG. 7) or between the terminal of the third electronic device 500 and the terminal of the second electronic device 400. According to the generation of contact between the terminal of the first electronic device 300 and the terminal of the third electronic device 500, the electrical connection between the first electronic device 300 and the third electronic device 500 may be made. The third electronic device 500 may transmit power to the first electronic device 300 through the electrical connection between the first electronic device 300 and the third electronic device 500, and a communication channel between the first electronic device 300 and the third electronic device 500 may be established. According to the generation of contact between the terminal of the second electronic device 400 and the terminal of the third electronic device 500, the electrical connection between the second electronic device 400 and the third electronic device 500 may be made. The third electronic device 500 may transmit power to the second electronic device 400, and a communication channel between the second electronic device 400 and the third electronic device 500 may be established.

According to certain embodiments of the disclosure, the communication channel between the first electronic device 300 and the third electronic device 500 or the communication channel between the second electronic device 400 and the third electronic device 500 may be a communication channel in various schemes that can be implemented according to the electrical connection between the first electronic device 300 and the third electronic device 500 or the electrical connection between the second electronic device 400 and the third electronic device 500. According to an embodiment, the electrical connection between the first electronic device 300 and the third electronic device 500 may be made by the electrical connection between the terminal of the first electronic device 300 and the terminal of the third electronic device 500. According to an embodiment, the communication channel between the first electronic device 300 and the third electronic device 500 may be a communication channel implemented by power line communication (PLC) generated between the charging circuit of the first electronic device 300 (such as, for example, the charging circuit 340 of FIG. 4) and the charging circuit 540 of the third electronic device 500. According to another embodiment, the electrical connection between the first electronic device 300 and the third electronic device 500 may be a wireless communication (such as, for example, Bluetooth, BLE, or NFC) connection made without contact between the first electronic device 300 and the third electronic device 500. According to an embodiment, the electrical connection between the second electronic device 400 and the third electronic device 500 may be made by contact between the terminal of the second electronic device 400 and the terminal of the third electronic device 500. According to an embodiment, the communication channel between the second electronic device 400 and the third electronic device 500 may be a communication channel implemented by power line communication (PLC) generated between the charging circuit of the second electronic device 400 and the charging circuit 540 of the third electronic device 500. According to another embodiment, the electrical connection between the second electronic device 400 and the third electronic device 500 may be a wireless communication (such as, for example, Bluetooth, BLE, or NFC) connection made without contact between the second electronic device 400 and the third electronic device 500.

According to certain embodiments of the disclosure, the third electronic device 500 may receive state information of the first electronic device 300 (such as, for example, a charging state of the first electronic device 300 (such as, for example, a remaining capacity state, a charging voltage, or temperature) or information on another electronic device connected to the first electronic device 300) or transmit state information of the second electronic device 400 (such as, for example, charging state information of the second electronic device 400) or state information of the third electronic device 500 (such as, for example, whether the third electronic device 500 is charged or not or temperature information of the third electronic device 500) through the communication channel established according to the electrical connection between the first electronic device 300 and the third electronic device 500.

According to certain embodiments of the disclosure, the third electronic device 500 may receive state information of the second electronic device 400 (such as, for example, a charging state of the second electronic device 400 (such as, for example, a remaining capacity state, a charging voltage, or temperature) or information on another electronic device connected to the second electronic device 400) or transmit state information of the first electronic device 300 (such as, for example, charging state information of the first electronic device 300) or state information of the third electronic device 500 (such as, for example, whether the third electronic device 500 is charged or not or temperature information of the third electronic device 500) through the communication channel established according to the electrical connection between the second electronic device 400 and the third electronic device 500.

According to certain embodiments of the disclosure, the memory 520 may store data received through a communication circuit (such as, for example, the wireless communication module 192 of FIG. 1) of the third electronic device or information (such as, for example, identification information of the third electronic device 500) stored while the third electronic device 500 is manufactured. According to an embodiment, the memory 520 may store information for a wireless communication connection between the third electronic device 500 and the first electronic device (such as, for example, the first electronic device 300 of FIG. 3), the second electronic device (such as, for example, the second electronic device 400 of FIG. 3), and/or the fourth electronic device (such as, for example, the fourth electronic device 600 of FIG. 3). For example, the memory 520 may store address information of the first electronic device 300, address information of the second electronic device 400, or address information of the fourth electronic device 600.

According to certain embodiments of the disclosure, the processor 510 may be operatively connected to various electronic elements (such as, for example, the memory 520) included in the third electronic device 500 and may control various elements operatively connected to the processor 510.

According to certain embodiments of the disclosure, the processor 510 may receive information on the first electronic device 300 from the first electronic device 300 through the communication channel established according to the electrical connection between the first electronic device 300 and the third electronic device 500. The charging circuit 540 may receive information on the first electronic device 300 from the first electronic device 300 and transmit the information on the first electronic device 300 to the processor 510 through the communication channel established according to the electrical connection between the first electronic device 300 and the third electronic device 500.

According to certain embodiments of the disclosure, the information on the first electronic device 300 may be address information of the first electronic device 300 utilized for the connection through wireless communication between the first electronic device 300 and the second electronic device 400. For example, the address information of the first electronic device 300 may include at least one of an IP address of the first electronic device 300, a MAC address of the first electronic device 300, or a Bluetooth address of the first electronic device 300.

According to certain embodiments of the disclosure, the processor 510 may receive information on the second electronic device 400 through the communication channel established according to the electrical connection between the second electronic device 400 and the third electronic device 500.

According to certain embodiments of the disclosure, the information on the second electronic device 400 may be address information of the second electronic device 400 utilized for the connection through wireless communication between the first electronic device 300 and the second electronic device 400. For example, the address information of the second electronic device 400 may include at least one of an IP address of the second electronic device 400, a MAC address of the second electronic device 400, or a Bluetooth address of the second electronic device 400.

According to certain embodiments of the disclosure, the processor 510 may transmit the information on the second electronic device 400 received from the second electronic device 400 to the first electronic device 300. The processor 510 may transmit the information on the first electronic device 300 received from the first electronic device 300 to the second electronic device 400.

According to certain embodiments of the disclosure, the operation in which the third electronic device 500 transmits data (such as, for example, address information of the second electronic device 400) to the first electronic device 300 and the operation of transmitting data (such as, for example, address information of the first electronic device 300) to the second electronic device 400 may use a biphase mark code scheme. For example, when transmitting the information on the second electronic device 400 to the first electronic device 300, the processor 510 may control the charging circuit 540 by controlling the voltage of a signal including the information on the second electronic device 400. In another example, when receiving the information on the first electronic device 300 from the first electronic device 300, the processor 510 may control the charging circuit 540 to receive the information on the first electronic device 300 by controlling the current of a signal including the information on the first electronic device 300. The above scheme may prevent the generation of interference of signals exchanged between the first electronic device 300 and the third electronic device 500.

According to certain embodiments of the disclosure, a message including information on the first electronic device 300 and information on the second electronic device 400 exchanged through the third electronic device 500 may include a preamble indicating beginning of data transmission, a header of the data, and the data. The header of the data may include a header type, a parity bit for verifying whether the header has an error, and a start bit indicating the beginning of data. The data may include a data message including information on the first electronic device 300 or information on the second electronic device 400, a parity bit for verifying whether data has an error, a checksum for verifying integrity of data, and a stop bit indicating the end of data.

According to certain embodiments of the disclosure, after receiving information on the first electronic device 300, the processor 510 may transmit a message indicating reception of the information on the first electronic device 300 to the first electronic device 300.

According to certain embodiments of the disclosure, the processor 510 may control data communication between the first electronic device 300 and the third electronic device 500 through the communication channel established by the electrical connection between the first electronic device 300 and the third electronic device 500 and control data communication between the second electronic device 400 and the third electronic device 500 through the communication channel established by the electrical connection between the second electronic device 400 and the third electronic device 500.

According to an embodiment, the charging circuit 540 may control data communication between the first electronic device 300 and the third electronic device 500 through the communication channel established by the electrical connection between the first electronic device 300 and the third electronic device 500 and control data communication between the second electronic device 400 and the third electronic device 500 through the communication channel established by the electrical connection between the second electronic device 400 and the third electronic device 500.

According to certain embodiments of the disclosure, the third electronic device 500 may further include a user interface device (such as, for example, an LED device 713 of FIG. 7) which can output an indicator indicating an operation state of the third electronic device 500. The processor 510 may control the user interface to output the indicator indicating the state supplying (or charging) power to the first electronic device 300 and/or the second electronic device 400. The processor 510 may control the user interface to output the indicator indicating the state in which the first electronic device 300 and/or the second electronic device 400 exchange data (such as, for example, information on the first electronic device 300 or information on the second electronic device 400). According to an embodiment, the third electronic device 500 may control the user interface to output the indicator indicating the state in which the first electronic device 300 and/or the second electronic device 400 exchange data (such as, for example, information on the first electronic device 300 or information on the second electronic device 400) or the state in which information on the electronic device to be paired is updated in response to reception of a user input making a request for updating information on the electronic device to be paired in the state in which the indicator indicating that the first electronic device 300 and/or the second electronic device 400 are being charged is output.

According to certain embodiments of the disclosure, the user interface device which can output the indicator indicating the operation state of the third electronic device 500 may be implemented in various forms. For example, the user interface device may be implemented as the LED device 713 which can output a visual indicator. In another example, the user interface device may be implemented as a speaker which can output an auditory indicator (such as, for example, a sound indicating a state in which the first electronic device 300 and/or the second electronic device 400 update information on the electronic device to be paired, a sound indicating the remaining battery of the third electronic device 500, a sound indicating the remaining battery of the first electronic device 300 and/or the second electronic device 400, and a sound indicating the operation state of the first electronic device 300 and/or the second electronic device 400). In another example, the user interface device may be implemented as a haptic module which can output a tactile indicator.

Figure 7:
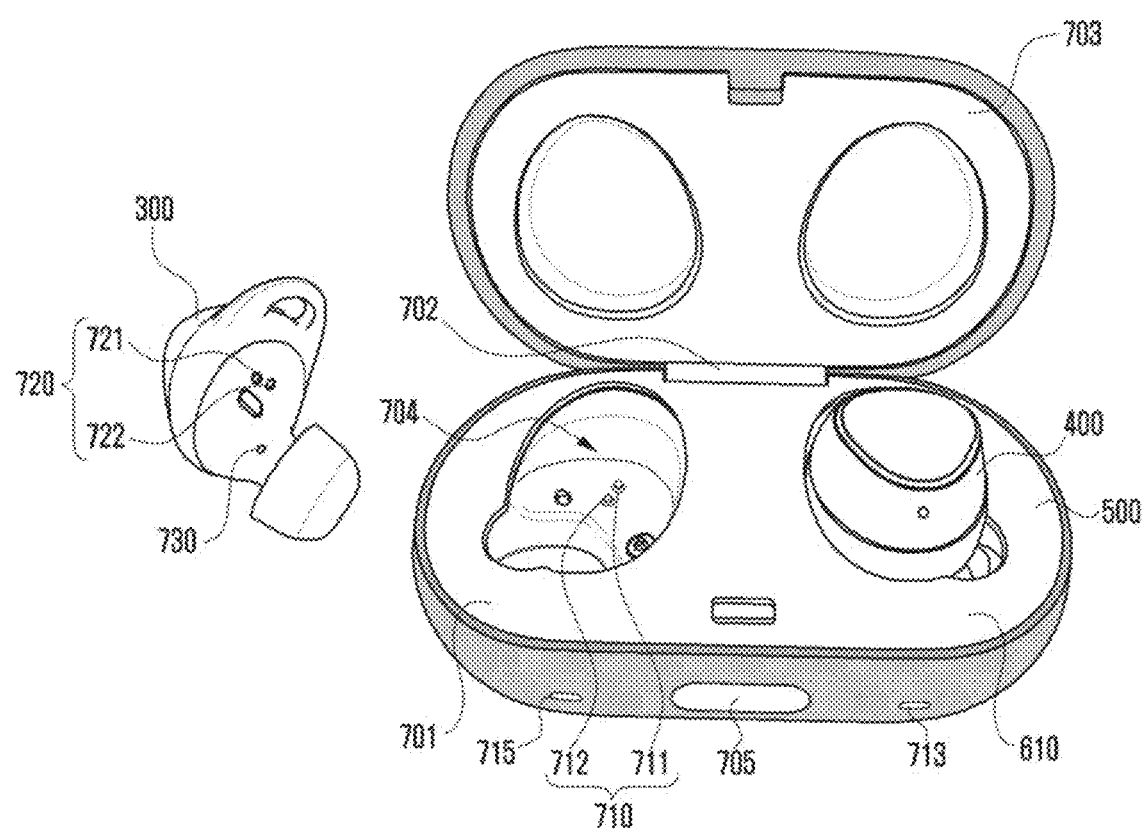
FIG. 7 illustrates the first electronic device, the second electronic device, and the third electronic device according to certain embodiments of the disclosure.

FIGS. 6 and 7 illustrate the first electronic device, the second electronic device, and the third electronic device according to certain embodiments of the disclosure.

As illustrated in FIGS. 6 and 7, the first electronic device 300 and/or the second electronic device 400 according to an embodiment of the disclosure may be wireless earphones, and the third electronic device 500 may be a cradle into which the first electronic device 300 and/or the second electronic device 400 can be inserted.

According to an embodiment, the third electronic device 500 may include a housing 610 configured in a case form which can keep the first electronic device 300 and/or the second electronic device 400.

According to an embodiment, the housing 610 may include a first housing structure 701 having a groove 704 in which the first electronic device 300 and/or the second electronic device 400 can be seated, a second housing structure 703 serving as a cover of the first housing structure 701, and a hinge structure 702 combines the first housing structure 701 and the second housing structure 703 to be rotatable. For example, one side of the first housing structure 701 may be coupled to one side of the second housing structure 703 through the hinge structure 702 in an open state in which the second housing structure 703 has a predetermined angle from the first housing structure 701. The third electronic device 500 may include a physical button 705 for releasing fastening between the first housing structure 701 and the second housing structure 703. The fastening between the first housing structure 701 and the second housing structure 703 may be released through the control of the physical button 705. One of the first housing structure 701 and the second housing structure 703 may include a magnet, and the other one may include a magnet sensor. The third electronic device 500 may detect a fastened state or a released state between the first housing structure 701 and the second housing structure 703 through a magnet sensor.

According to certain embodiments of the disclosure, the third electronic device 500 may include at least one LED device (such as, for example, a first LED device 713 and a second LED device 715) which can output an indicator indicating an operation state of the third electronic device 500.

According to an embodiment, the first electronic device 300 and/or the second electronic device 400 may be seated in the grooves 704 formed in the first housing structure 701. According to an embodiment, the grooves 704 of the first housing structure 701 may be formed such that earbuds of the first electronic device 300 and/or the second electronic device 400 are inserted into the inside of the grooves 704.

The example of FIGS. 6 and 7 illustrate a state in which the first electronic device 300 and/or the second electronic device 400 are seated in the grooves 704 formed in the first housing structure 701. According to an embodiment, when the first electronic device 300 and/or the second electronic device 400 are seated in the grooves 704, opposite sides of the earbuds of the first electronic device 300 and/or the second electronic device 400 may be exposed when viewed from above the first housing structure 701.

According to an embodiment, the first electronic device 300 and/or the second electronic device 400 may include microphones 730 (such as, for example, the microphone 392 of FIG. 4) for receiving sound-based inputs from a user. Touch sensors 601 (such as, for example, the touch pad 370 of FIG. 4) may be formed on opposite sides of the earbuds of the first electronic device 300 and/or the second electronic device 400, for permitting control functions of the first electronic device 300 and/or the second electronic device 400 via touch inputs detected through the touch sensors 601. For example, the user may control a volumes or select a song for playback through touch inputs generated via the touch sensors 601 while the earbuds are worn. In another example, as the touch sensors 601 are exposed even while the first electronic device 300 and/or the second electronic device 400 are seated in the grooves 704 of the third electronic device 500, the user may control the first electronic device 300 and/or the second electronic device 400 through the touch sensor 601 while the first electronic device 300 and/or the second electronic device 400 are disposed in the grooves 704. For example, the user may control short-range communication, for example, a Bluetooth communication pairing mode through the touch sensors 601 while the first electronic device 300 and/or the second electronic device 400 are seated in the third electronic device 500.

According to certain embodiments of the disclosure, the first electronic device 300 may perform a series of operations for updating connection information for pairing (such as, for example, with the second electronic device 400) in response to receiving a user input to the touch sensors 601.

As illustrated in FIG. 7, one or more terminals 710 that supplies power to the first electronic device 300 and/or the second electronic device 400 may be formed in the grooves 704 of the first housing structure 701. For example, the one or more terminals 710 may include a first terminal 711 for supplying a high potential voltage and a second terminal 712 for supplying a low potential voltage. According to an embodiment, the first electronic device 300 may include terminals 720 that physically contact with the one or more terminals 711 and 712, while the first electronic device 300 is seated in the groove 704 of the first housing structure 701. For example, the terminals 720 may include a third terminal 721 that physically contact with the first terminal 711 and a fourth terminal 722 that physically contact with the second terminal 712 when the first electronic device 300 is seated in the groove 704. According to an embodiment, the grooves 704 of the first housing structure 701 are formed such that the earbuds of the first electronic device 300 and/or the second electronic device 400 are inserted into an interior of the grooves 704. Thus the terminals 720 of the first electronic device 300 may be formed on a side on which the earbud is formed (such as, for example, the opposite side of the touch sensor 601) which may facilitate physical contact with the terminals 710 of the third electronic device 500, when the first electronic device 300 is seated in the groove 704.

According to certain embodiments of the disclosure, the first electronic device 300 and the third electronic device 500 may establish a communication channel using an electrical path formed by an electrical connection between the first terminal 711 and the third terminal 721 and an electrical connection formed between the second terminal 712 and the fourth terminal 722. For example, the communication channel between the first electronic device 300 and the third electronic device 500 may include a communication channel implemented for power line communication (PLC). According to an embodiment, the communication channel between the first electronic device 300 and the third electronic device 500 may include a communication channel implemented through short-range communication (such as, for example, Bluetooth, Bluetooth low energy (BLE), or NFC).

Figure 8:
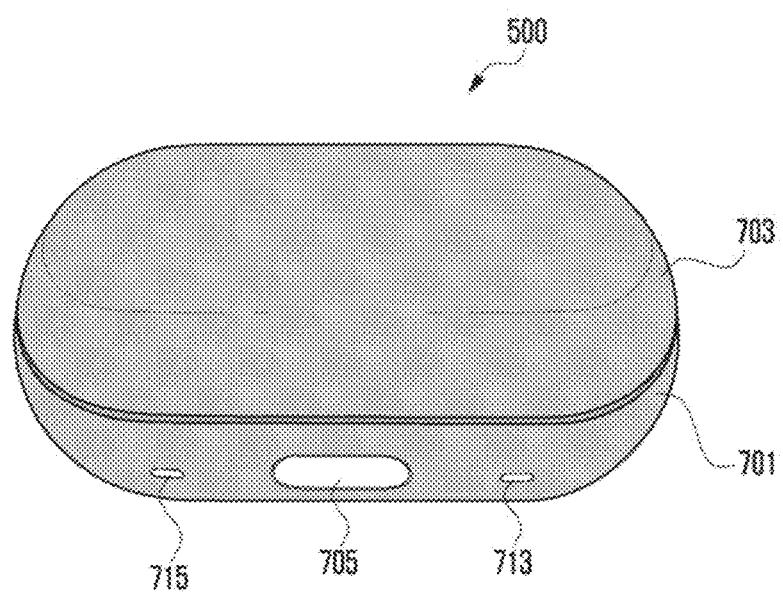
FIG. 8 is a side perspective view illustrating the third electronic device according to certain embodiments of the disclosure.
Figure 9:
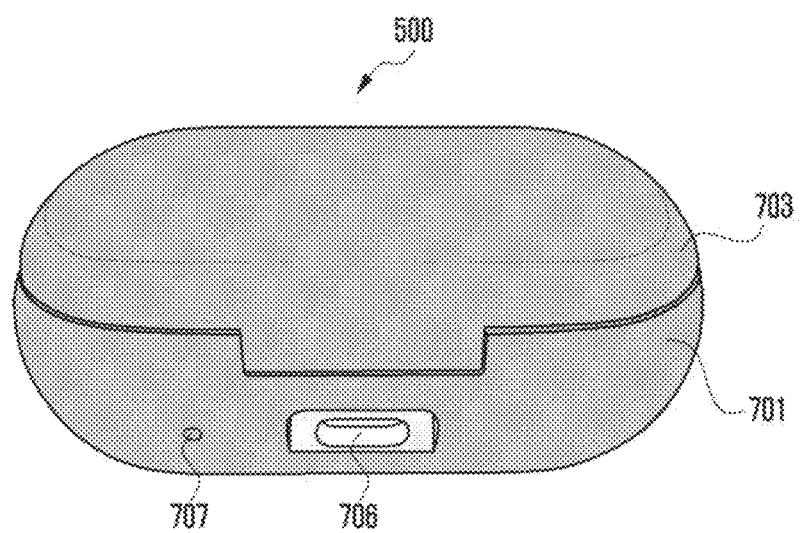
FIG. 9 is another side perspective view illustrating the third electronic device according to certain embodiments of the disclosure.

FIG. 8 is a side perspective view of the third electronic device (such as, for example, the third electronic device 500 of FIG. 3) according to an embodiment. FIG. 9 is another side perspective view of the third electronic device 500 according to an embodiment.

Referring to FIG. 8, in the third electronic device 500 according to an embodiment of the disclosure, includes two housing structures 701 and 703 were are rotatable relative to one another. Accordingly, when an angle between the first housing structure 701 and the second housing structure 703 is set at a certain predetermined angle, such as, for example, 0 to 10 degrees, the first housing structure 701 and the second housing structure 703 may be disposed so as to face each other, and the second housing structure 703 may thus cover an entirety of an interior surface of the first housing structure 701. For example, one side of the first housing structure 701 (such as, for example, the front side of the first housing structure 701) may be where grooves are formed (such as, for example, the grooves 704 of FIG. 7) in which the wireless earphones (such as, for example, the first electronic device 300 and/or the second electronic device 400) are seated when inserted.

According to an embodiment, the first housing structure 701 and the second housing structure 703 may be fastened closed, while the second housing structure 703 completely covers the entire interior surface of the first housing structure 701. The fastening may be released by control of a physical button 705 formed on a lateral side of the first housing structure 701. For example, the user may release the fastening by pressing the physical button 705 formed on another lateral side of the first housing structure 701 (such as, for example, the lateral side of the first housing structure 701).

According to an embodiment, the third electronic device 500 may supply power to the first electronic device 300 and/or the second electronic device 400 stored in the grooves 704 of the third electronic device 500 in the closed state. According to an embodiment, LED devices (such as, for example, the first LED device 713 and the second LED device 715) may be formed, as a user interface device, on another lateral side of the first housing 610 (such as, for example, the lateral side of the first housing 610). For example, the LED devices 713 and 715 may be formed around the physical button 705. According to an embodiment, the LED devices 713 and 715 may display a predetermined color to indicate a charging state of the first electronic device 300 and/or the second electronic device 400. For example, the LED devices 713 and 715 may display a red color while the first electronic device 300 and/or the second electronic device 400 are in the process of being charged, and may display a green color when the first electronic device 300 and/or the second electronic device 400 are fully charged. When the LED devices 713 and 715 are implemented as two or more LED devices 713 and 715, the two or more LED devices 713 and 715 may output different information. For example, the first LED device 713 may output a state of the first electronic device 300, and the second LED device 715 may output a state of the second electronic device 400.

Referring to FIG. 9, a wired interface terminal 706 for facilitating connection with a wired power supply device may be formed on the other lateral side of the first housing structure 701. For example, the wired power supply device may supply power to the third electronic device 500 through a wired connection such as a travel adapter (TA) and may include, for example, a wired high voltage (HV) device (such as, for example, an adaptive fast charger (AFC) and quick charger (QC)).

According to an embodiment, the first housing structure 701 may include an LED device (such as, for example, a third LED device) 707 indicating connection of the wired power supply device to the third electronic device 500. For example, the third LED device 707 may be formed around the wired interface terminal 706 and may include at least one third LED device 707. According to an embodiment, when the wired power supply device is connected to the third electronic device 500, the third LED device 707 may display a predetermined color, for example, a red color.

Although not illustrated in FIGS. 6 to 9, the third electronic device 500 may further include a button for controlling other electronic devices (such as, for example, the first electronic device 300, the second electronic device 400, and/or the fourth electronic device 600) connected to the third electronic device 500 (such as, for example, controlling the sound output operation of the first electronic device 300 and/or the second electronic device 400 and controlling the communication connection of the fourth electronic device 600). The third electronic device 500 may control other electronic devices connected to the third electronic device 500 in response to an input for the button. The button may be implemented as a pressure sensor or a touch sensor to detect a user input.

According to certain embodiments of the disclosure, the third electronic device 500 may transmit a signal making a request for updating information on an electronic device to be paired to the first electronic device 300 in response to identification of satisfaction of a predetermined condition (such as, for example, a condition of receiving a user input made on the button 705 implemented in the third electronic device 500, a condition of removing the first electronic device 300 or the second 400 from the third electronic device 500 a predetermined number of times or more, or a condition of opening or closing the second housing structure 703 implemented in the third electronic device 500 a predetermined number of times or more). The first electronic device 300 may update the information on the electronic device to be paired on the basis of information on the second electronic device 400 in response to reception of the signal making the request for updating the information on the electronic device to be paired.

Figure 10:
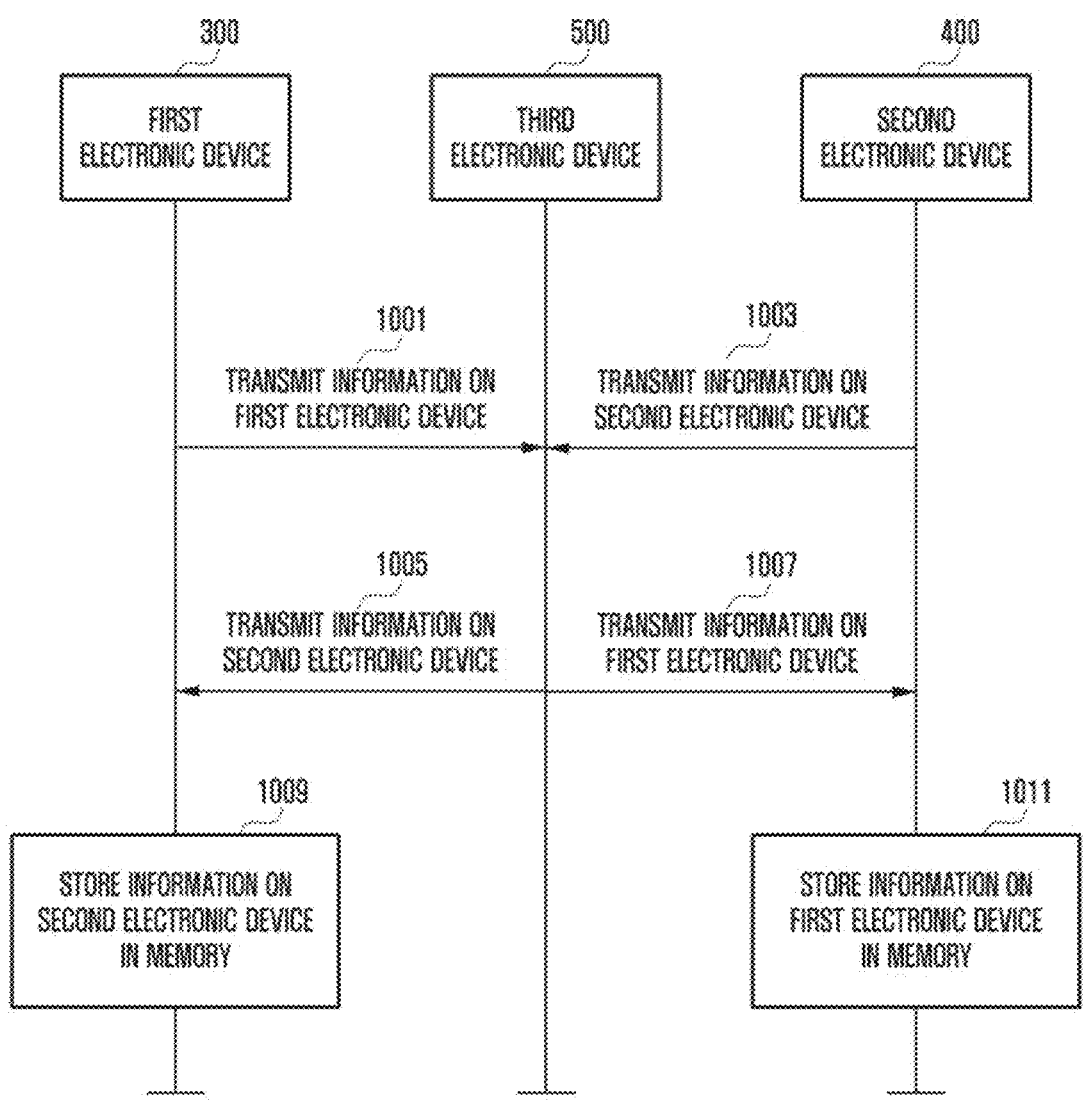
FIG. 10 is an operation flowchart illustrating an embodiment in which the first electronic device, the second electronic device, and the third electronic device exchange information for establishing a communication connection according to certain embodiments of the disclosure.

FIG. 10 is an operation flowchart illustrating an embodiment in which the first electronic device, the second electronic device, and the third electronic device exchange information for establishing a communication connection according to certain embodiments of the disclosure.

According to certain embodiments of the disclosure, in operation 1001, the first electronic device (such as, for example, the first electronic device 300 of FIG. 3) may transmit information on the first electronic device 300 (e.g., connection information, such as an address for pairing) to the third electronic device 500.

According to certain embodiments of the disclosure, the information on the first electronic device 300 may be address information of the first electronic device 300 utilized for the connection through wireless communication between the first electronic device 300 and the second electronic device 400. For example, the address information of the first electronic device 300 may include at least one of an IP address of the first electronic device 300, a MAC address of the first electronic device 300, or a Bluetooth address of the first electronic device 300.

According to certain embodiments of the disclosure, the first electronic device 300 may be connected to the third electronic device 500 through various communication schemes (such as, for example, wired communication or wired communication (such as, for example, including Bluetooth, Bluetooth low energy (BLE), or Wi-Fi).

According to certain embodiments of the disclosure, the first electronic device 300 may transmit information on the first electronic device 300 to the third electronic device 500 through a communication channel established by an electrical connection between the terminal of the first electronic device 300 (such as, for example, the third terminal 721 or the fourth terminal 722 of FIG. 7) and the terminal of the third electronic device 500 (such as, for example, the first terminal 711 or the second terminal 712 of FIG. 7). According to an embodiment, the first electronic device 300 may transmit information on the first electronic device 300 to the third electronic device 500 in response to reception of a user input on the touch pad 370 while the first electronic device 300 is electrically connected to the third electronic device 500.

According to certain embodiments of the disclosure, in operation 1003, the second electronic device (such as, for example, the second electronic device 400 of FIG. 3) may transmit information on the second electronic device 400 to the third electronic device 500.

According to certain embodiments of the disclosure, the information on the second electronic device 400 may be address information of the second electronic device 400 utilized for the connection through wireless communication between the first electronic device 300 and the second electronic device 400. For example, the address information of the second electronic device 400 may include at least one of an IP address of the second electronic device 400, a MAC address of the second electronic device 400, or a Bluetooth address of the second electronic device 400.

According to certain embodiments of the disclosure, the second electronic device 400 may transmit information on the second electronic device 400 to the third electronic device 500 through a communication channel established by an electrical connection between the terminal of the second electronic device 400 (such as, for example, the third terminal 721 or the fourth terminal 722 of FIG. 7) and the terminal 711 or 712 of third electronic device 500.

According to certain embodiments of the disclosure, operation 1001 and operation 1003 may be performed irrespective of order. According to an embodiment, when both the first electronic device 300 and the second electronic device 400 are inserted into the grooves 704 formed in the first housing structure 701 of the third electronic device 500, the third electronic device 500 may perform operation 1001 and 1003. For example, power for charging may be supplied when one of the first electronic device 300 or the second electronic device 400 is inserted into the groove 704, and communication may be performed when both the first electronic device 300 and the second electronic device 400 are disposed in the grooves 704. According to certain embodiments of the disclosure, the third electronic device 500 may temporarily store the received information on the first electronic device 300 and/or information on the second electronic device 500 in the memory (such as, for example, the memory 520 of FIG. 5).

According to certain embodiments of the disclosure, in operation 1005, the third electronic device 500 may transmit information on the second electronic device 400 to the first electronic device 300. For example, the first electronic device 300 may establish a communication connection with the second electronic device 400 based on the received information on the second electronic device 400.

According to certain embodiments of the disclosure, the third electronic device 500 may transmit the information on the second electronic device 400 to the first electronic device 300 through the communication channel established through the electrical connection between the terminal 721 or 722 of the first electronic device 300 and the terminal 711 or 712 of the third electronic device 500. According to an embodiment, the third electronic device 500 may transmit identification information (such as, for example, ID) of the third electronic device 500 to the first electronic device 300.

According to certain embodiments of the disclosure, in operation 1007, the third electronic device 500 may transmit information on the first electronic device 300 to the second electronic device 400. For example, the second electronic device 400 may establish the communication connection with the first electronic device 300 based on the received information on the first electronic device 300.

According to certain embodiments of the disclosure, the third electronic device 500 may transmit the information on the first electronic device 300 to the second electronic device 400 through the communication channel established through the electrical connection between the terminal 721 or 722 of the second electronic device 400 and the terminal 711 or 712 of the third electronic device 500. According to an embodiment, the third electronic device 500 may transmit identification information (such as, for example, ID) of the third electronic device 500 to the second electronic device 400.

According to certain embodiments of the disclosure, the third electronic device 500 may delete the information on the first electronic device 300 and/or the information on the second electronic device 400 from the memory 520 after transmitting the same.

According to certain embodiments of the disclosure, operation 1005 and operation 1007 may be performed regardless of the order.

According to certain embodiments of the disclosure, in operation 1009, the first electronic device 300 may store the information on the second electronic device 400 that was received from the third electronic device 500 in the memory (such as, for example, the memory 330 of FIG. 4).

According to certain embodiments of the disclosure, in operation 1011, the second electronic device 400 may store the information on the first electronic device 300 received from the third electronic device 500 in the memory (such as, for example, the memory 330 of FIG. 4).

According to certain embodiments of the disclosure, the first electronic device 300 may update the information on the electronic device to be paired on the basis of the received information on the second electronic device 400, and the second electronic device 400 may update the information on the electronic device to be paired on the basis of the received information on the first electronic device 300.

According to certain embodiments of the disclosure, the first electronic device 300 may stand by without updating the information on the electronic device to be paired in the state in which the information on the second electronic device 400 is stored in the memory 330. The first electronic device 300 may update the information on the electronic device to be paired on the basis of the information on the second electronic device 400 received from the third electronic device 500 in response to identification of satisfaction of a specific condition.

According to certain embodiments of the disclosure, the first electronic device 300 may update the information on the electronic device to be paired on the basis of the information on the second electronic device 400 received from the third electronic device 500 in response to reception of a signal making a request for updating the information on the electronic device to be paired from the second electronic device 400, the third electronic device 500, and/or the fourth electronic device 600.

According to certain embodiments of the disclosure, the third electronic device 500 may transmit the signal making the request for updating the information on the electronic device to be paired to the first electronic device 300 in response to identification of satisfaction of a predetermined condition (such as, for example, a condition of receiving a user input made on the button implemented in the third electronic device 500, a condition of removing the first electronic device 300 or the second electronic device 400 from the third electronic device 500 a predetermined number of times or more, or a condition of opening or closing a case cover implemented in the third electronic device 500 a predetermined number of times or more).

According to certain embodiments of the disclosure, the fourth electronic device 600 may transmit the signal making the request for updating the information on the electronic device to be paired to the first electronic device 300 through short-range communication (such as, for example, Bluetooth, Bluetooth low energy (BLE), or NFC) in response to identification of satisfaction of a predetermined condition (such as, for example, reception of a user input making a request for an update on the display). An embodiment in which the fourth electronic device 600 transmits the signal making the request for updating the information on the electronic device to be paired to the first electronic device 300 is described with reference to FIG. 11.

According to certain embodiments of the disclosure, the first electronic device 300 may transmit information indicating the electronic device to be paired, stored in the first electronic device 300 to the third electronic device 500. The second electronic device 400 may transmit information indicating the electronic device to be paired, stored in the second electronic device 400 to the third electronic device 500. The first electronic device 300 and/or the second electronic device 400 may compare the information indicating the paired electronic device stored in the second electronic device 400 with the information indicating the paired electronic device stored in the first electronic device 300 and determine whether to update the information indicating the paired electronic device on the basis of the comparison result.

Figure 11:
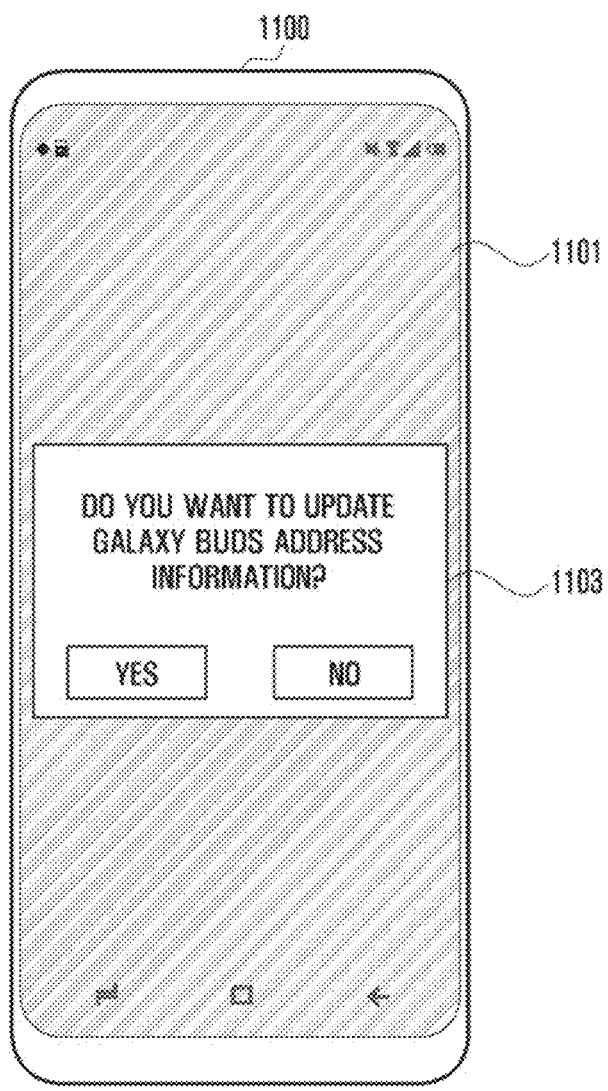
FIG. 11 illustrates an embodiment in which the fourth electronic device receives a user input for updating information on the first electronic device or the second electronic device according to certain embodiments of the disclosure.

FIG. 11 illustrates an embodiment in which the fourth electronic device receives a user input for updating information on the first electronic device or the second electronic device according to certain embodiments of the disclosure.

According to certain embodiments of the disclosure, a fourth electronic device 1100 (such as, for example, the fourth electronic device 600 of FIG. 3) may display a screen 1103 prompting a user whether to change address information on an electronic device (e.g., a wireless earbud) to be paired from the first electronic device 300 on a display 1101 (such as, for example, the display device 160 of FIG. 1).

The fourth electronic device 1100 according to certain embodiments of the disclosure may receive a user input confirming an operation to update the address information on the electronic device to be paired, on the display 1101 (not shown). The fourth electronic device 600 may transmit the signal making the request for updating the information on the electronic device to be paired to the first electronic device 300 or the second electronic device 400 in response to reception of the user input making the request for updating the information on the electronic device to be paired.

According to certain embodiments of the disclosure, when firmware versions for controlling the operation of the first electronic device 300 and/or the second electronic device 400 are different, the fourth electronic device 1100 may display a screen for updating firmware of at least one of the first electronic device 300 and/or the second 400 on the display 1101. For example, when firmware versions of the first electronic device 300 and the second electronic device 400 are different, an update operation may be performed. Even through the second electronic device 400 is connected to a new first electronic device 300, the second electronic device 400 may operate using the same firmware version through the above operation, and thus a stable wireless communication connection between the first electronic device 300 and the second electronic device 400 may be implemented.

The above embodiment is an embodiment that can be implemented on the basis of the assumption that the first electronic device 300 and the second electronic device 400 are connected to the same fourth electronic device 1100, but the disclosure can be implemented even when the first electronic device 300 and the second electronic device 400 are connected to different electronic devices. In this case, the first electronic device 300 and the second electronic device 400 may update electronic devices to be paired on the basis of whether they receive signals making a request for updating information on the electronic device to be paired from electronic devices connected thereto, respectively. Alternatively, the first electronic device 300 and the second electronic device 400 may add electronic devices to be paired on the basis of whether they receive signals making a request for adding information on electronic devices to be paired from the electronic devices connected thereto, respectively. For example, the first electronic device 300 may be connected to the fourth electronic device 1100, and the second electronic device 400 may be connected to a fifth electronic device (not shown) (such as, for example, the electronic device 101 of FIG. 1) different from the fourth electronic device. The first electronic device 300 may update (or add) the electronic device to be paired in response to reception of the signal making the request for updating (or adding) information on the electronic device to be paired from the fourth electronic device 1100. The second electronic device 400 may update (or add) the electronic device to be paired in response to reception of the signal making the request for updating (or adding) the information on the electronic device to be paired from the fifth electronic device.

An electronic device (such as, for example, the first electronic device 300 of FIG. 3) according to certain embodiments of the disclosure may include a communication circuit (such as, for example, the communication module 310 of FIG. 4) configured to transmit or receive data to or from a second external electronic device (such as, for example, the third electronic device 500 of FIG. 5) into which the electronic device 300 and a first external electronic device (such as, for example, the second electronic device 400 of FIG. 3) can be inserted or the first external electronic device 400, a charging circuit (such as, for example, the charging circuit 340 of FIG. 4) configured to receive power from the second external electronic device 500 and control a communication channel through an electrical connection between the second external electronic device 500 and the electronic device 300, a memory (such as, for example, the memory 330 of FIG. 4), and a processor (such as, for example, the processor 320 of FIG. 3) operatively connected to the communication circuit 310 and the charging circuit 340, in which the processor 320 may be configured to control the charging circuit 340 to receive information on the first external electronic device 400 for establishing a communication connection between the first external electronic device 400 and the electronic device 300 from the second external electronic device 500 through the communication channel, control the charging circuit 340 to transmit information on the electronic device 300 for establishing the communication connection between the first external electronic device 400 and the electronic device 300 to the second external electronic device 500 through the communication channel, and store the information on the first external electronic device 400 in the memory 130.

In the electronic device 300 according to certain embodiments of the disclosure, the processor 320 may be configured to control the communication circuit 310 to establish a communication connection between the first external electronic device 400 and the electronic device 300, based on the received information on the first external electronic device 400.

In the electronic device 300 according to certain embodiments of the disclosure, the processor 320 may be configured to control the charging circuit 340 to transmit state information of the electronic device 300 to the second external electronic device 500 through the communication channel.

In the electronic device 300 according to certain embodiments of the disclosure, the communication channel may be implemented by power line communication (PLC) generated based on an electrical connection between the electronic device 300 and the second external electronic device 500.

In the electronic device 300 according to certain embodiments of the disclosure, the processor 320 may be configured to identify whether a condition related to whether information on an electronic device (such as, for example, the first external electronic device 400) to be paired is updated is satisfied and determine whether to update the information on the electronic device 400 to be paired, based on information on the first external electronic device 400 according to an identification result.

In the electronic device 300 according to certain embodiments of the disclosure, the processor 320 may be configured to identify whether there is information on an external electronic device (such as, for example, the second electronic device 500) which can supply power to the electronic device 300 in the memory 330 and update the information on the electronic device 400 to be paired to the information on the first external electronic device 400 in response to identification that there is no information on the external electronic device 500 which can supply power to the electronic device 300 in the memory 330.

In the electronic device 300 according to certain embodiments of the disclosure, the processor 320 may be configured to not update the information on the electronic device 400 to be paired to the information on the first external electronic device 400 in response to identification that the information on the external electronic device which can supply power to the electronic device 300 does not match information on the second external electronic device 500.

In the electronic device 300 according to certain embodiments of the disclosure, the processor 320 may be configured to receive the information on the external electronic device (such as, for example, the second external electronic device 500) which can supply power to the first external electronic device 400 through the communication circuit or the charging circuit and not update the information on the electronic device 400 to be paired to the information on the first external electronic device 400 in response to identification that the received information on the external electronic device 500 matches information on the second external electronic device.

In the electronic device 300 according to certain embodiments of the disclosure, the processor 320 may be configured to update the information on the electronic device to be paired to the information on the first external electronic device 400 in response to reception of a signal making a request for updating the information on the electronic device (such as, for example, the second electronic device 400 of FIG. 3) to be paired, transmitted by a third external electronic device (such as, for example, the fourth electronic device 600 of FIG. 3) connected to the electronic device 300 and/or the first external electronic device 400.

The electronic device 300 according to certain embodiments of the disclosure may further include a microphone (such as, for example, the microphone 392 of FIG. 4) operatively connected to the processor 320, in which the processor 320 may be configured to update the information on the electronic device to be paired, based on information on the first external electronic device 400 in response to reception of a signal making a request for updating the information on the electronic device to be paired, implemented in a sound form through the microphone 392.

An electronic device (such as, for example, the third electronic device 500 of FIG. 3) according to certain embodiments of the disclosure may include a charging circuit (such as, for example, the charging circuit 540 of FIG. 5) configured to transmit power to a first external electronic device (such as, for example, the first electronic device 300 of FIG. 3) and/or a second electronic device (such as, for example, the second electronic device 400 of FIG. 3), a memory (such as, for example, the memory 520 of FIG. 5), and a processor (such as, for example, the processor 510 of FIG. 5), in which the processor 510 may be configured to control the charging circuit 540 to receive information on the first external electronic device 300 from the first external electronic device 300 through a first communication channel established by an electrical connection between a first terminal (such as, for example, the first terminal 711 or the second terminal 712 of FIG. 7) of the electronic device 500 and the first external electronic device 300, and control the charging circuit 540 to transmit the information on the first external electronic device 300 to the second external electronic device 400 through a second communication channel established by an electrical connection between a second terminal 711 or 712 of the electronic device 500 and the second external electronic device 400.

In the electronic device 500 according to certain embodiments of the disclosure, the first communication channel may be implemented by power line communication (PLC) generated as the first terminal 711 or 712 is electrically connected to the first external electronic device 300, and the second communication channel may be implemented by PLC generated as the second terminal 711 or 712 is electrically connected to the second external electronic device 400.

In the electronic device 500 according to certain embodiments of the disclosure, the information on the first external electronic device 300 may include address information of the first external electronic device 300 for a communication connection between the first external electronic device 300 and the second external electronic device 400.

Figure 12:
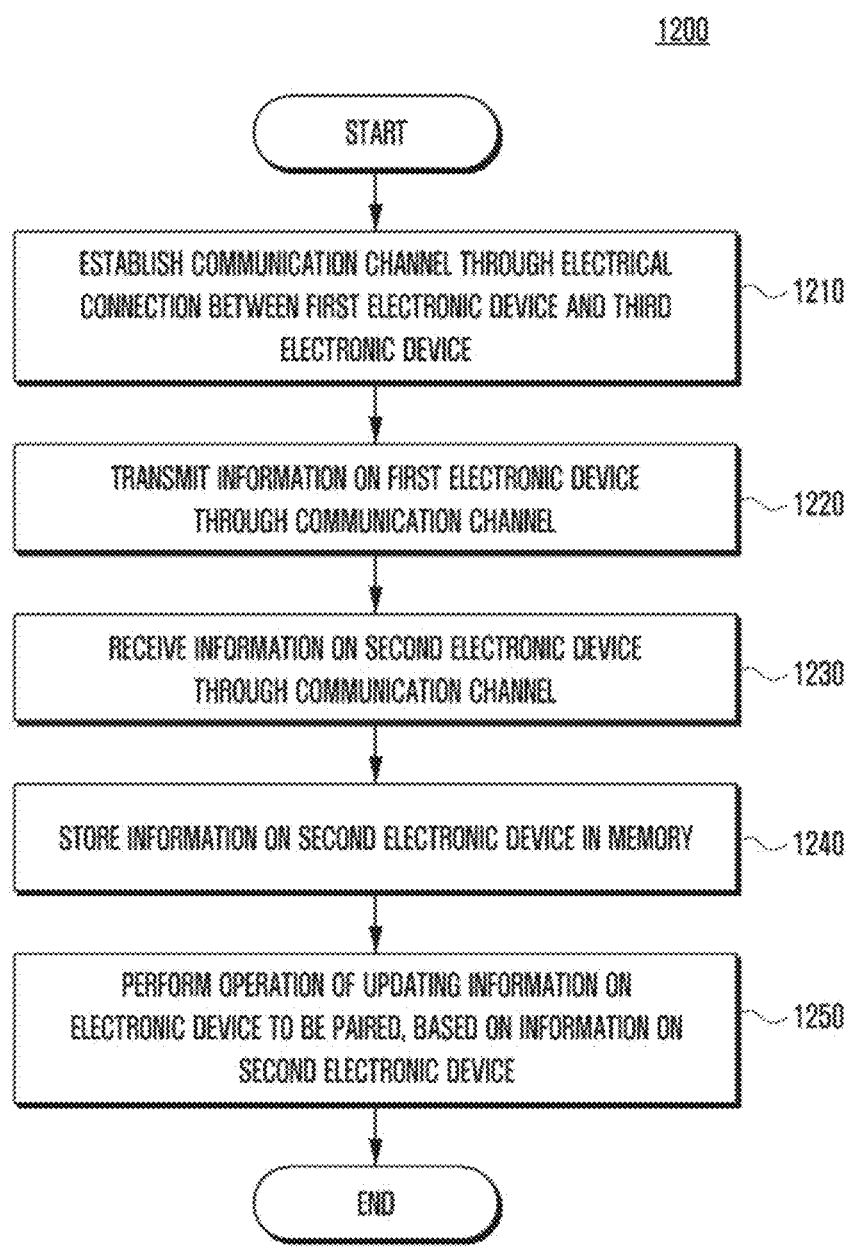
FIG. 12 is a flowchart illustrating a method of operating an electronic device according to certain embodiments.

FIG. 12 is an operation flowchart illustrating a method 1200 of operating the electronic device according to certain embodiments of the disclosure.

According to certain embodiments of the disclosure, in operation 1210, the first electronic device (such as, for example, the first electronic device or wireless earbud 300 of FIG. 6) may establish a communication channel through an electrical connection between the first electronic device 300 and the third electronic device (such as, for example, the third electronic device or charging case 500 of FIG. 3).

According to certain embodiments of the disclosure, the first electronic device 300 may establish a communication channel via an electrical connection formed between a terminal of the first electronic device 300 (such as, for example, the third terminal 721 or the fourth terminal 722 of FIG. 7) and the terminal of the third electronic device 500 (such as, for example, the first terminal 711 or the second terminal 712 of FIG. 7). For example, the communication channel between the first electronic device 300 and the third electronic device 500 may be implemented via power line communication (PLC). According to an embodiment, the communication channel between the first electronic device 300 and the third electronic device 500 may be implemented through short-range communication (such as, for example, Bluetooth, Bluetooth low energy (BLE), or NFC). According to an embodiment, when wireless charging between the first electronic device 300 and the third electronic device 500 is supported, the communication channel between the first electronic device 300 and the third electronic device 500 may be supported by a wireless charging scheme.

According to certain embodiments of the disclosure, in operation 1220, the first electronic device 300 may transmit information on the first electronic device 300 (e.g., address information for itself) to the third electronic device 500 through the communication channel.

According to certain embodiments of the disclosure, the information on the first electronic device 300 may include address information on itself. For example, the address information of the first electronic device 300 may include at least one of an IP address of the first electronic device 300, a MAC address of the first electronic device 300, and/or a Bluetooth address of the first electronic device 300.

According to certain embodiments of the disclosure, in operation 1230, the first electronic device 300 may receive information of the second electronic device 400 (e.g., the wireless earbud 400 from FIG. 4) from the third electronic device 500 through the communication channel.

According to certain embodiments of the disclosure, the information on the second electronic device 400 may be address information of the second electronic device 400 utilized for the connection through wireless communication between the first electronic device 300 and the second electronic device 400. For example, the address information of the second electronic device 400 may include at least one of an IP address of the second electronic device 400, a MAC address of the second electronic device 400, or a Bluetooth address of the second electronic device 400.

According to certain embodiments of the disclosure, the first electronic device 300 may receive the information on the second electronic device 400 from the third electronic device 500 through the communication channel established by the electrical connection between the terminal 721 or 722 of the first electronic device 300 and the terminal 711 or 712 of the third electronic device 500.

According to certain embodiments of the disclosure, in operation 1240, the first electronic device 300 may store the received information on the second electronic device 400 in the memory (such as, for example, the memory 330 of FIG. 4).

According to certain embodiments of the disclosure, in operation 1250, the first electronic device 300 may update the information on an electronic device to be paired, based on the received information on the second electronic device 400.

According to certain embodiments of the disclosure, the first electronic device 300 may stand by without updating the information on the electronic device to be paired after storing the information on the second electronic device 400 in the memory 330 in the state in which the information on the second electronic device 400 is stored in the memory 330. The first electronic device 300 may update the information on the electronic device to be paired on the basis of the information on the second electronic device 400 in response to identification of satisfaction of a specific condition.

According to certain embodiments of the disclosure, the first electronic device 300 may update the information on the electronic device to be paired on the basis of the information on the second electronic device 400 in response to reception of a signal making a request for updating the information on the electronic device to be paired from the second electronic device 400, the third electronic device 500, and/or the fourth electronic device 600.

According to certain embodiments of the disclosure, the third electronic device 500 may transmit the signal making the request for updating the information on the electronic device to be paired to the first electronic device 300 in response to identification of satisfaction of a predetermined condition (such as, for example, a condition of receiving a user input made on the button implemented in the third electronic device 500, a condition of removing the first electronic device 300 or the second electronic device 400 from the third electronic device 500 a predetermined number of times or more, or a condition of opening or closing a case cover implemented in the third electronic device 500 a predetermined number of times or more).

According to certain embodiments of the disclosure, the fourth electronic device 600 may transmit the signal making the request for updating the information on the electronic device to be paired to the first electronic device 300 through short-range communication (such as, for example, Bluetooth, Bluetooth low energy (BLE), or NFC) in response to identification of satisfaction of a predetermined condition (such as, for example, reception of a user input making a request for an update on the display).

According to an embodiment, when establishing the communication channel through the electrical connection with the third electronic device 500, the second electronic device 400 may perform operations 1210 to 1250 of FIG. 12. The second electronic device 400 may establish the communication channel through the electrical connection with the third electronic device 500 and transmit information on the second electronic device 400 to the third electronic device 500 through the established communication channel. The second electronic device 400 may receive information on the first electronic device 300 from the third electronic device 500 through the established communication channel and store the information on the first electronic device 300 in the memory of the second electronic device 400. The second electronic device 400 may perform the operation of updating the information on the electronic device to be paired on the basis of the stored information on the first electronic device 300.

According to an embodiment, after performing the operation of updating the information on the electronic device to be paired, the first electronic device 300 and the second electronic device 400 may perform an operation of making the communication connection between the first electronic device 300 and the second electronic device 400 on the basis of the updated information on the electronic device to be paired.

A method (such as, for example, the method 1200 of operating the electronic device in FIG. 12) of operating an electronic device (such as, for example, the first electronic device 300 of FIG. 3) according to certain embodiments of the disclosure may include an operation of establishing a communication channel between the electronic device 300 and a second external electronic device 500 through an electrical connection with the second external electronic device (such as, for example, the third electronic device 500 of FIG. 3) into which the electronic device 300 and a first external electronic device (such as, for example, the second electronic device 400 of FIG. 3) can be inserted, an operation of transmitting information on the electronic device 300 to the second external electronic device 500 through the communication channel, an operation of receiving information on the first external electronic device 400 through the communication channel, and an operation of storing the information on the first external electronic device 400 in a memory (such as, for example, the memory 330 of FIG. 4).

The method 1200 of operating the electronic device according to certain embodiments of the disclosure may further include an operation of establishing a communication connection with the first external electronic device 400 through the communication circuit (such as, for example, the communication circuit 310 of FIG. 4), based on the information on the first external electronic device 400.

The method of operating the electronic device according to certain embodiments of the disclosure may further include an operation of transmitting state information of the electronic device 300 to the second external electronic device 500 through the communication channel.

In the method 1200 of operating the electronic device according to certain embodiments of the disclosure, the communication channel may be implemented by power line communication (PLC) generated based on an electrical connection between the electronic device 300 and the second external electronic device 500.

The method 1200 of operating the electronic device according to certain embodiments of the disclosure may further include an operation of identifying whether a condition related to whether information on an electronic device to be paired is updated is satisfied and an operation of determining whether to update the information on the electronic device to be paired, based on the information on the first external electronic device 400 according to an identification result.

The method 1200 of operating the electronic device according to certain embodiments of the disclosure may further include an operation of identifying whether there is information on an external electronic device (such as, for example, the third electronic device 500 of FIG. 3) which can supply power to the electronic device 300 in the memory 330 and an operation of updating the information on the electronic device to be paired to the information on the first external electronic device 400 in response to identification that there is no information on the external electronic device which can supply power to the electronic device 300 in the memory 330.

The method 1200 of operating the electronic device according to certain embodiments of the disclosure may further include an operation of determining to not update the information on the electronic device to be paired to the information on the first external electronic device 400 in response to identification that the information on the external electronic device 500 which can supply power to the electronic device 300 does not match information on the second external electronic device 500.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A wireless earphone device comprising:
   a first electronic device;
   a second electronic device; and
   a third electronic device in which the first electronic device and the second electronic device are inserted,
   wherein the third electronic device comprises:
   a charging circuit configured to transmit power to the first electronic device and the second electronic device, including a first terminal and a second terminal;
   a memory; and
   a processor,
   wherein the processor is configured to:
   establish a first communication channel between the first electronic device and the third electronic device, through an electrical connection formed between the first terminal and the first electronic device and a second communication channel between the second electronic device and the third electronic device through an electrical connection formed between the second terminal and the second electronic device,
   receive, from the first electronic device and via the first communication channel, connection information on the first electronic device,
   receive, from the second electronic device and via the second communication channel, connection information on the second electronic device,
   transmit, to the first electronic device and via the first communication channel, the connection information on the second electronic device,
   transmit, to the second electronic device and via the second communication channel, the connection information on the first electronic device,
   detect a first user input on a touch sensor of the first electronic device and a second user input on a touch sensor of the second electronic device, and
   in response that the first user input and the second user input satisfy predetermined condition, transmit, to the first electronic device, a request signal for updating connection information of an external electronic device to be paired with the first electronic device, wherein the predetermined condition includes a condition related to touch input time of the first user input and the second user input,
   wherein the first electronic device is configured to:
   in response to receiving the request signal for updating the connection information of the external electronic device to be paired with the first electronic device, determine whether the connection information of the external electronic device to be paired with the first electronic device is different from the connection information of the second electronic device, and
   update the connection information of the external electronic device to the connection information of the second electronic device based on the determination that the connection information of the external electronic device is different from the connection information of the second electronic device.

2. The wireless earphone device of claim 1, wherein the first electronic device is configured to:
   establish a communication connection between the first electronic device and the second electronic device, based on the updated connection information of the external electronic device.

3. The wireless earphone device of claim 1, wherein the first electronic device is configured to:
   transmit, through the first communication channel, state information of the first electronic device to the third electronic device.

4. The wireless earphone device of claim 1, wherein the first communication channel is implemented via power line communication (PLC), generated based on the electrical connection between the first terminal and the first electronic device.

5. The wireless earphone device of claim 1, wherein the first electronic device is configured to:
   execute updating the connection information on the external electronic device to be paired with the first electronic device according to detecting whether a preset condition is satisfied.

6. The wireless earphone device of claim 5, wherein the first electronic device is configured to:
   search a memory of the first electronic device for stored connection information of a power-supplying external device; and
   based on detecting the stored connection information of the power-supplying external device is not stored in the memory, update the connection information on the external electronic device to be paired with the first electronic device using the connection information on the second electronic device.

7. The wireless earphone device of claim 6, wherein the first electronic device is configured to:
   detect whether the connection information of the power-supplying external device is different from connection information of the third electronic device, and
   based on detecting a difference, maintain the connection information on the external electronic device without updating the connection information on the external electronic device to be paired with the first electronic device to the connection information on the second electronic device.

8. The wireless earphone device of claim 5, wherein the first electronic device is configured to:
   receive connection information on a power-supplying external electronic device that supplies power to the second electronic device through a communication circuit of the first electronic device, and
   based on detecting that the received connection information on the power-supplying external electronic device matches the connection information on the third electronic device, maintaining the connection information on the external electronic device without updating the connection information on the external electronic device to be paired with the first electronic device to the connection information on the second electronic device.

9. The wireless earphone device of claim 1, wherein the first electronic device is further configured to receive, via a microphone of the first electronic device, the request signal.

10. A method of operating a wireless earphone device comprising a first electronic device, a second electronic device and a third electronic device in which the first electronic device and the second electronic device are inserted, the method comprising:
- establishing, by the third electronic device, a first communication channel between the first electronic device and the third electronic device, through an electrical connection formed between a first terminal of a charging circuit of the third electronic device and the first electronic device and a second communication channel between the second electronic device and the third electronic device through an electrical connection formed between a second terminal of the charging circuit of the third electronic device and the second electronic device,
- receiving, by the third electronic device, connection information on the first electronic device via the first communication channel,
- receiving, by the third electronic device connection information on the second electronic device via the second communication channel,
- transmitting, by the third electronic device the connection information on the first electronic device to the electronic device via the second communication channel;
- transmitting, by the third electronic device, the connection information on the second electronic device to the first electronic device via the first communication channel:
- detecting, by the third electronic device, a first user input on a touch sensor of the first electronic device and a second user input on a touch sensor of the second electronic device;
- in response that the first user input and the second user input satisfy predetermined condition, transmitting, by the third electronic device a request signal for updating connection information of an external electronic device to be paired with the first electronic device to the first electronic device,
- in response to receiving the request signal for updating the connection information of the external electronic device to be paired with the first electronic device, determining, by the first electronic device, whether the connection information of the external electronic device to be paired with the first electronic device is different from the connection information of the second electronic device, and
- updating, by the first electronic device, the connection information of external electronic device to be paired with the electronic device to the connection information of the first external electronic device based on the determination that the connection information of the external electronic device stored in the memory is different from the connection information of the first external electronic device.

11. The method of claim 10, further comprising:
- establishing, by the first electronic device, a communication connection with the second electronic device based on the updated connection information of the external electronic device.

12. The method of claim 10, further comprising:
- transmitting, by the first electronic device, state information of the first electronic device to the third electronic device via the first communication channel.

13. The method of claim 10, wherein the first communication channel is implemented via power line communication (PLC), generated based on the electrical connection between the first electronic device and the third electronic device.

14. The method of claim 10, further comprising:
- executing, by the first electronic device, an update of the connection information on the external electronic device to be paired with the first electronic device according to detecting whether a preset condition is satisfied.

15. The method of claim 14, further comprising:
- searching, by the first electronic device, a memory of the first electronic device for stored connection information of a power-supplying external device; and
- based on detecting the stored connection information of the power-supplying external device is not stored in the memory, updating, by the first electronic device, the connection information on the external electronic device to be paired with the first electronic device using the connection information on the second electronic device.

16. The method of claim 15, further comprising:
- detecting, by the first electronic device, whether the connection information of the power-supplying external device is different from connection information of the third electronic device, and
- based on detecting a difference, maintaining the connection information on the external electronic device to be paired with the first electronic device without updating the connection information on the external electronic device to be paired with the first electronic device to the connection information on the second electronic device.

* * * * *